(12) United States Patent
Reed

(10) Patent No.: US 8,995,511 B2
(45) Date of Patent: Mar. 31, 2015

(54) EMULATION AND CONTROLLED TESTING OF MIMO OTA CHANNELS

(75) Inventor: John Douglas Reed, Arlington, TX (US)

(73) Assignee: Spirent Communications, Inc., Sunnyvale, CA (US)

( * ) Notice: Subject to any disclaimer, the term of this patent is extended or adjusted under 35 U.S.C. 154(b) by 681 days.

(21) Appl. No.: 13/147,579

(22) PCT Filed: Feb. 13, 2010

(86) PCT No.: PCT/US2010/024204
§ 371 (c)(1),
(2), (4) Date: Aug. 29, 2011

(87) PCT Pub. No.: WO2010/094000
PCT Pub. Date: Aug. 19, 2010

(65) Prior Publication Data
US 2011/0299570 A1    Dec. 8, 2011

Related U.S. Application Data

(60) Provisional application No. 61/152,652, filed on Feb. 13, 2009, provisional application No. 61/166,620, filed on Apr. 3, 2009, provisional application No. 61/184,444, filed on Jun. 5, 2009.

(51) Int. Cl.
| | | |
|---|---|---|
| H04B 1/69 | (2011.01) | |
| H04W 24/06 | (2009.01) | |
| H04B 7/04 | (2006.01) | |
| H04B 17/00 | (2006.01) | |
| H04B 7/10 | (2006.01) | |

(52) U.S. Cl.
CPC ............ *H04W 24/06* (2013.01); *H04B 7/0434* (2013.01); *H04B 17/0085* (2013.01); *H04B 17/009* (2013.01); *H04B 7/10* (2013.01)
USPC ........................................ 375/224; 455/562.1

(58) Field of Classification Search
USPC ......... 375/130, 224; 342/360; 455/101, 562.1
See application file for complete search history.

(56) References Cited

U.S. PATENT DOCUMENTS

| | | | |
|---|---|---|---|
| 5,548,820 A | 8/1996 | Victorin | |
| 6,236,363 B1 * | 5/2001 | Robbins et al. | ............... 342/360 |
| 6,349,218 B1 | 2/2002 | Nakagawa et al. | |
| 6,952,455 B1 | 10/2005 | Banister | |
| 2003/0050020 A1 * | 3/2003 | Erceg et al. | ................... 455/101 |
| 2008/0056340 A1 * | 3/2008 | Foegelle | ....................... 375/224 |

OTHER PUBLICATIONS

International Search Report mailed Aug. 2, 2010 in PCT/US2010/024204, pp. 1-3.

\* cited by examiner

*Primary Examiner* — Myron K Wyche
(74) *Attorney, Agent, or Firm* — Haynes Beffel & Wolfeld LLP; Ernest J. Beffel, Jr.

(57) ABSTRACT

The present invention relates to techniques for OTA testing suitable for producing a test signal to emulate a wireless channel while using a limited number of transmit elements. The techniques described herein enable the number of transmit antennas used to emulate a given signal path in an emulated wireless channel to be less than the number of sub-paths used to characterize the angle spread of the given signal path. As a result, a test setup is provided having a relatively small number of transmit antennas which also accurately maintaining the desirable characteristics of the emulated wireless channel.

30 Claims, 31 Drawing Sheets

EMULATION AND CONTROLLED TESTING OF MIMO OTA CHANNELS

BACKGROUND OF THE INVENTION

1. Field of the Invention

The present invention relates to lab based over-the-air (OTA) testing of multiple antenna devices, and more particularly to techniques for OTA testing suitable for producing a test signal to emulate a wireless channel while using a limited number of transmit elements.

2. Description of Related Art

When designing over-the-air (OTA) testing approaches, channel modeling concepts are applied in order to insure that the received signal is representative of the desired test condition. Modern radio systems use different technologies including spread spectrum techniques such as wide-band code division multiple access (WCDMA), and orthogonal frequency division multiple access (OFDMA). These two technologies are significantly different in the way they process the receive signal, leading to differences in how the RF channel is modeled. This impacts the design of an OTA test.

For wide band radio systems, the multi-path radio channel can be modeled as a series delayed copies of the signal. For spread spectrum systems, such as WCDMA, each delayed copy of the signal that is resolvable within the radio bandwidth is called a path, and is typically characterized by a narrow angle spread. Each path is detected and may be processed or combined in a manner determined by the design of the receiver. Thus for this type of air interface, the paths are carefully specified to allow multiple antenna processing to be correctly emulated.

OFDM systems rely on the data being encoded and transmitted in a series of narrow band sub-carriers spaced across the operating bandwidth of the channel. As such, the signals are inherently narrow band, and not able to distinguish the individual paths that are modeled for the spread spectrum systems. Rather, the channel is modeled as the composite of all signal paths. Thus the spatial channel effects will be observed using all paths in combination, and typically result in higher angle spread values. The wide-band effects of the multi-path channel will be observed as frequency selective fading across the band affecting each sub-carrier, although the individual paths will not be distinguishable.

Use of predefined channel models can be used to define an OTA test. Recorded signals obtained from channel measurements can also be used in a play-back fashion to generate test signals.

Most channel models such as the Spatial Channel Model (SCM) have been designed to be antenna independent, i.e. they are suitable for a variety of possible antenna arrangements. Thus the model provides a way to specify a stochastic geometric based spatio-temporal description of the paths between a base station (BS) and a mobile station (MS), such that the performance of the antennas of the base station and mobile station can be applied and modeled separately from the channel model. The base station and the mobile station will then make use of the paths in the channel model along with their antenna characteristics to produce a complete end-to-end channel for evaluation and testing.

In order to include the antenna characteristics in a measurement of radio link performance using an OTA technique, it is necessary to generate and wirelessly transmit an accurate test signal such that the antennas of the device-under-test can act upon the received signal in a controlled way. For the purposes of testing, a signal to be received by the MS can be generated without requiring the BS to be present in the simulated path, or visa-versa. This is done by providing the proper signals to the transmitting and receiving elements of a portion of the channel that is being modeled.

However, generating the test signals for an over-the-air test is complex. There are multiple paths, and each path must be constructed to produce the proper angle of arrival and angle spread, to produce the proper correlation between antennas at the device-under-test. Thus many individual transmit elements (also referred to as probes herein) would typically be required to be located in a variety of positions with an anechoic chamber to produce an adequate test signal. Having many probes is costly and complex to implement. Furthermore, having many probes will degrade the characteristics of the chamber due to additional reflections that may be produced.

Therefore it is desirable to techniques for OTA testing suitable for producing a test signal to emulate a wireless channel suitable for evaluating multiple antenna devices while using a limited number of transmit elements.

SUMMARY OF THE INVENTION

Techniques described herein for OTA testing are useful for producing a test signal to emulate a wireless channel while using a limited number of transmit elements. The techniques described herein enable the number of transmit antennas used to emulate a given signal path in an emulated wireless channel to be less than the number of sub-paths used to characterize the angle spread of the given signal path. As a result, a test setup is provided having a relatively small number of transmit antennas which also accurately maintaining the desirable characteristics of the emulated wireless channel.

A system for emulating a wireless channel between a transmitter and a receiver is described herein. The wireless channel comprises one or more signal paths having respective amplitudes, angles of arrival and angle spreads. The angle spread of a given signal path in the wireless channel is represented as a plurality of N sub-paths. The system includes a set of two or more receive antenna having an effective, non-singular spatial correlation for the given signal path in the wireless channel. The system includes a plurality of transmit antennas for transmitting transmit signal to the set of receive antennas to emulate the given path in the wireless channel. The plurality of transmit antennas is less than N, and are arranged at angular locations relative to the set of receive antennas in dependence upon said effective spatial correlation. The system further includes circuitry coupled to the plurality of transmit antennas to generate the transmit signals and provide the transmit signals to corresponding transmit antennas. The transmit signals provided to the transmit antennas have a signal power in dependence upon said effective spatial correlation.

A method for emulating a wireless channel between a transmitter and a receiver is described herein. The wireless channel comprises one or more signal paths having respective amplitudes, angles of arrival and angle spreads. The angle spread of a given signal path in the wireless channel represented as a plurality of N sub-paths. The method includes determining an effective, non-singular spatial correlation of the given signal path for a set of two or more receive antennas. The method further includes computing angular locations for a plurality of transmit antennas relative to the set of two or more receive antennas in dependence upon said effective spatial correlation, the transmit antennas for transmitting transmit signals to the set of receive antennas to emulate the given path in the wireless channel, and the plurality of transmit antennas being less than N. The method further includes generating the transmit signals and providing the transmit signals to corresponding transmit antennas, wherein the transmit signals have a signal power in dependence upon said effective spatial correlation.

Other aspects and advantages of the present invention can be seen on review of the drawings, the detailed description, and the claims which follow.

DETAILED DESCRIPTION

Figure 1:
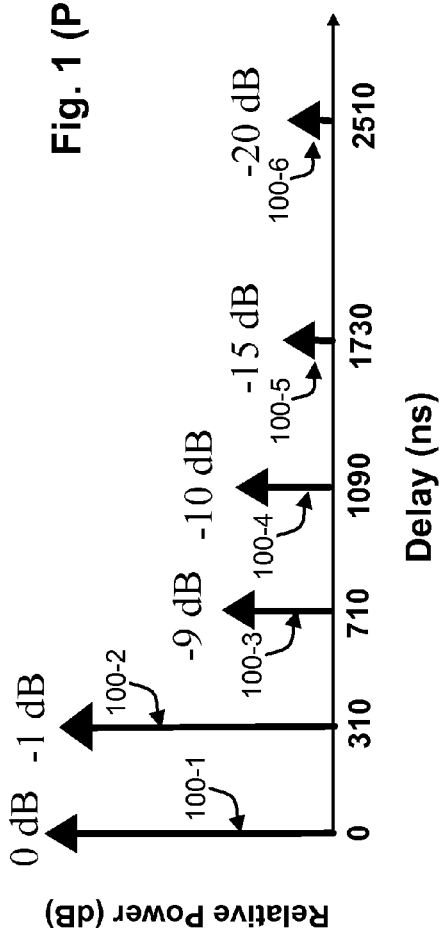
FIG. 1 illustrates an example power delay profile for a wireless channel between a transmitter and a receiver.

A detailed description of embodiments of the present invention is provided with reference to the FIGS. 1-34.

As mentioned above, generating the test signals for an over-the-air test to accurately emulate a wireless channel between a transmitter and a receiver is complex. Modern radio systems use different technologies including for example spread spectrum techniques such as wide-band code division multiple access (WCDMA), and orthogonal frequency division multiple access (OFDMA). These two techniques are significantly different in the way they process the received signal, however the modeling and generation of the wireless RF channel in the test environment is the same.

For spread spectrum systems the multi-path radio channel can be modeled as a series of delayed copies of the signal. Each delayed copy that is resolvable within the radio bandwidth is called a signal path. Each signal path is detected and may be processed or combined in a manner determined by the design of the receiver. Thus for this type of air interface, the signal path is carefully specified to allow multiple antenna processing to correctly emulated.

OFDM systems rely on the data being encoded and transmitted in a series of narrow band sub-carriers spaced across the operating bandwidth of the channel. As such, the signals are inherently narrow band, and are not able to distinguish the individual signal paths that are modeled for the spread spectrum systems. Consistent with this narrow band behavior, the channel can be modeled as the composite of all signal paths. Thus the spatial channel effects are observed using all signal paths in combination, and result in higher angle spread values. However, the wide-band effects of the multi-path channel are still present and will be observed as frequency selective fading across the band affecting each sub-carrier. Even though the individual signal paths will not be distinguishable, and the individual clusters are not resolvable, it can still be important to model them precisely in order to achieve the correct dynamic fading behaviors of each sub-carrier, which results from the cluster signal interaction. For this reason, it is necessary to model each path in the multi-path signal.

In standardized models, signal paths are defined as a signal arriving from a certain direction and having an azimuth angle spread representing a mean and a sigma. An average elevation angle and elevation spread may also be used which give a second mean and sigma representing the signal.

Signal paths may be characterized by discrete or continuous distributions of sub-paths. The Spatial Channel Model (SCM) uses a discrete representation using 20 equal powered sub-paths to represent each signal path. The sub-paths are distributed in angle with a non-linear spacing to emulate for example a Laplacian distribution, although some models use other distributions such as Gaussian.

The received signal is usually made of multiple late arriving copies of the transmitted signal with signal powers that are typically decreasing exponentially with increased delay time. This is described by the ITU Vehicular A model, which is one of many different models to describe the signal's multipath power delay profile.

FIG. 1 is one example of the power delay profile relative to the power in path 100-1, and shows six signal paths labeled 100-1 to 100-6 for a wireless channel model between a transmitter and a receiver, although more typically there will be 4 to 20 signal paths in most models. There will also be different models for Urban, Suburban, and Rural Environments. Each signal path 100-1 to 100-6 will also have a spatial aspect which is modeled by an angle of departure (AoD) from the transmitter and an angle of arrival (AoA) at the receiver.

Figure 2:
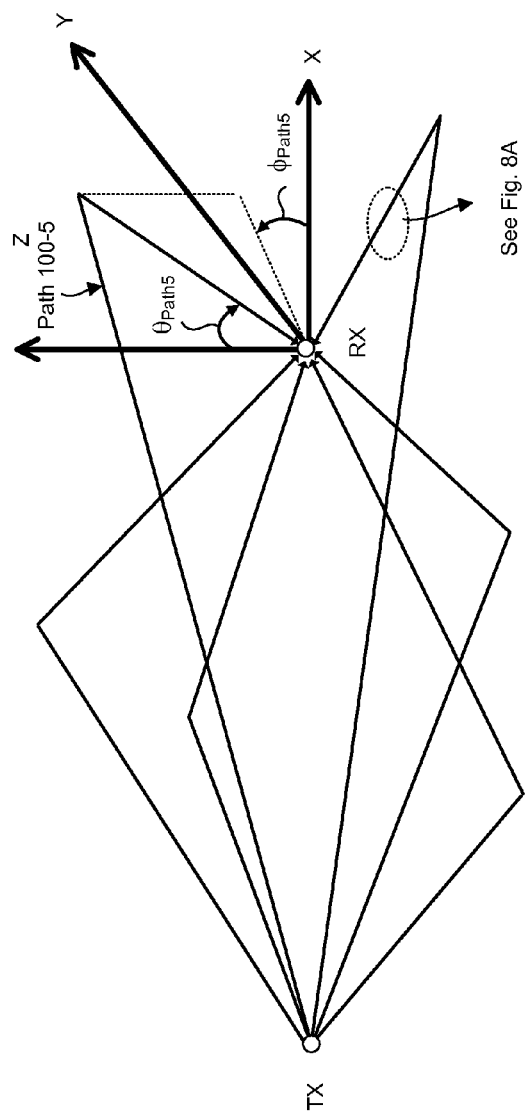
FIG. 2 illustrates a top view of the example wireless channel showing various signal paths.

FIG. 2 is a top view illustration of the example wireless channel model showing the signal paths 100-1 to 100-6. In FIG. 2 a base station (TX) at the left is transmitting a signal to a mobile device or other type of receiver (RX) on the right. Each signal path leaves the base station at a particular AoD and arrives at the receiver at a particular AoA. The AoA for each signal path 100-1 to 100-6 can be represented for example as an azimuth angle $\phi_{Pathi}$ and an elevation angle $\Theta_{Pathi}$, as shown in FIG. 2 for signal path 100-1. In this model, each signal path is a virtual path, such that the AoD and AoA are specified, but the path is not required to take any particular course between the transmitter and receiver. The signal paths will have a predefined delay and an arbitrary phase. The number of signal paths and their characteristics will vary from embodiment to embodiment depending upon the particular details of the wireless channel.

The probability distribution function (PDF) of the angles of departure of the signal transmitted by the base station can be characterized as a Gaussian with a sigma measured in degrees and a mean value equal to the line of sight (LOS) direction. The power azimuth spectrum (PAS) is a power weighted angle spread that generally results in a Laplacian distribution (exponential in power versus angle, and linear in dB versus angle) when averaged over many channel realizations.

The AoA model for the SCM is a function of the relative power of each signal path, where a random angle is drawn from a Gaussian distribution with a sigma that is a function of relative power. Other models can be used as well.

Figure 8A:
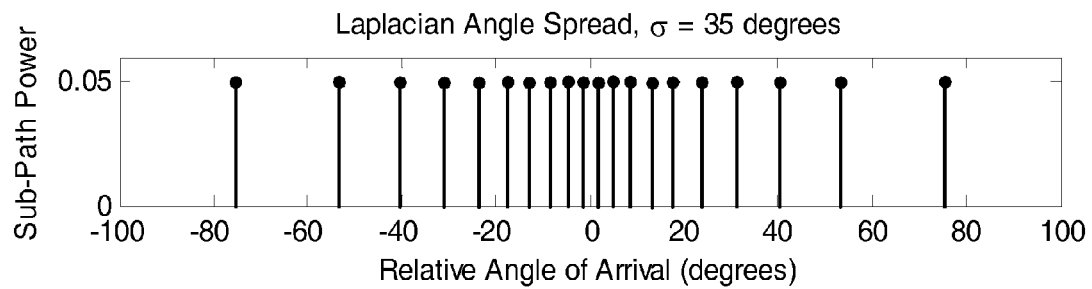
FIGS. 8A-8E illustrate a first example of emulating a 20 sub-path 35-degree azimuth spread signal path with three signal components using the techniques described herein.

Also illustrated in FIG. 2 is a reference to FIG. 8A illustrating an example angle spread of a signal path represented as a plurality of sub-paths. In the example in FIG. 8A, there are 20 sub-paths that are spatially distributed in azimuth with a Laplacian angle spread of 35 degrees. These 20 sub-paths represent the angle spread of the given signal path and are intended to received at the receiver. Once these signals are combined as voltages on the receive antennas of the mobile device, they form a Rayleigh faded signal on each antenna with a spatial correlation.

Thus, if the wireless channel illustrated in FIGS. 1 and 2 were emulated in an OTA test within an anechoic chamber, it would typically require a transmit antenna for each of the 20 sub-paths of each of the paths 100-1 to 100-6. Thus, many individual transmit antennas would be required to produce an adequate test environment. Having this many transmit antennas is costly and complex to implement. Furthermore, having this many transmit antennas will degrade the characteristics of the chamber due to additional reflections that may be produced, which reduces the accuracy of the test.

Multiple antenna devices can be characterized by the correlation between its antenna elements, which is a statistical measure of the similarity of the signals at the antennas based on the probability density function of the signal in power and angle which is received at each antenna. This is described by the following equation (1), in which the normalized relative power of each discrete plane wave arriving at the antennas is evaluated as a vector sum of the phase differences between elements based on the direction of the arrival of each of the discrete signal components.

$$\rho_{MS}(d) = \sum_{i=1}^{M} P_i \cdot \exp\left(j \frac{2\pi d_{MS}}{\lambda} \sin(\phi_i - \phi_a)\right)$$

Equation (1)

In standardized models, signal paths are defined as a signal arriving from a certain direction and having an azimuth spread represented by a mean and sigma. An average elevation angle and elevation spread may also be used which give a second mean and sigma representing the signal path.

Many parameters can be absent from a model while still producing a useful test condition. For example, the designer of the test condition may want to remove the elevation angle and elevation spread from the test, and use only azimuth variations. Also, the designer may use only vertically polarized signals for testing to simplify the test.

Figure 3:
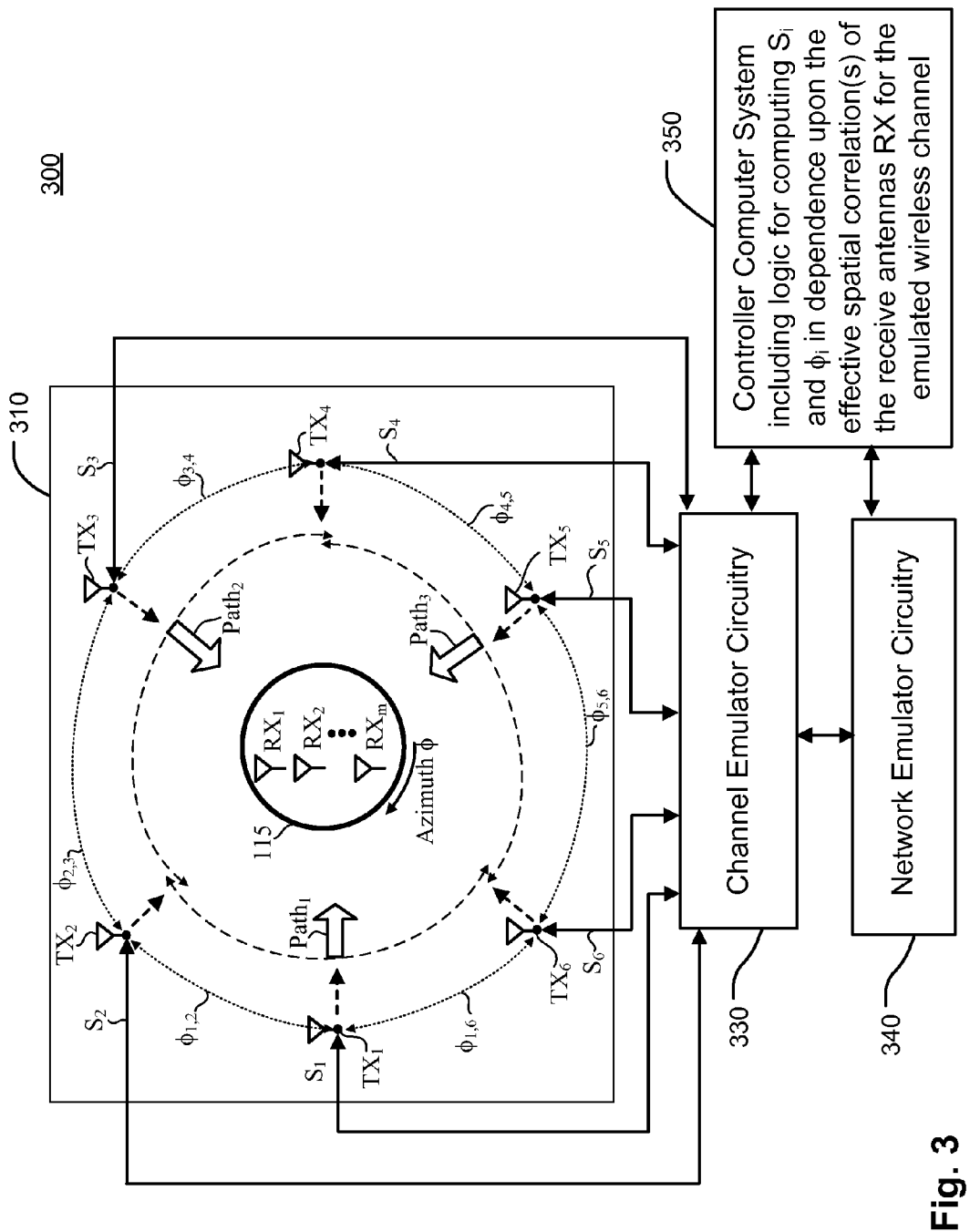
FIG. 3 is a simplified block diagram of an embodiment of a lab based system for emulating a wireless channel between a transmitter and a receiver as described herein.

FIG. 3 is a simplified block diagram of an embodiment of a lab based system 300 for emulating a wireless channel between a transmitter and a receiver as described herein, which can be used to evaluate the performance of multiple antenna devices.

The system 300 includes a set of two or more receive antennas $RX_1$ to $RX_m$ arranged on a turn table 315 within an anechoic chamber 310. The anechoic chamber 310 provides attenuation of reflected signals and suppression of external undesired interference signals as known in the art. The turn table 315 provides for azimuthal rotation of the set of receive antennas $RX_1$ to $RX_m$ during testing. The number m of receive antennas $RX_1$ to $RX_m$ will vary from embodiment to embodiment, depending upon the properties of the device under test (DUT), as described in more detail below.

In some embodiments a mobile device having the set of receive antennas $RX_1$ to $RX_m$ can be placed on the turn table 115, so that the performance of the mobile device can be evaluated using the techniques described herein. As used herein, the term "mobile device" refers generally to any portable device that has wireless connectivity via a set of two or more antennas to at least one network, such as a cellular network and/or internet. The mobile device may be a cellular telephone, PDA, laptop computer, or other device.

In yet other embodiments, the individual receive antennas $RX_1$ to $RX_m$ can be arranged on the turn table 115 without an associated mobile device. In such a case the receive antennas $RX_1$ to $RX_m$ can be instead coupled to transmitter/receiver circuitry including modulators and demodulators for transmitting and receiving radio frequency signals to and from a plurality of transmit antennas TX.

The plurality of transmit antennas TX are arranged within the anechoic chamber 110 and coupled to channel emulator circuitry 130 and network emulator circuitry 140. As described in more detail below, the arrangement of the transmit antennas TX and the characteristics of transmit signals $S_i$ provided to the transmit antennas TX which are then transmitted to the set of receive antennas $RX_1$ to $RX_m$ emulate a wireless channel characterized as N-paths between a transmitter and a receiver.

The transmit antennas TX are arranged at angular locations $\phi$, $\theta$ within the anechoic chamber 110 in dependence upon the spatial correlation(s) of the set of receive antennas $RX_1$ to $RX_m$ for the paths of the wireless channel being emulated. The determination of the relative angular location and transmit powers of the signals $S_i$ are discussed in more detail below.

As described in more detail below, the techniques described herein enable the number of transmit antennas TX used to emulate a given signal path to be less than the number of sub-paths used to characterize the angle spread of the given signal path in the wireless channel. As a result, the system 300 provides a test setup having a relatively small number of transmit antennas TX which also accurately maintaining the desirable characteristics of the emulated wireless channel.

As shown in the top view of the anechoic chamber 110 in FIG. 3, the transmit antennas TX are arranged in azimuth angle $\phi$. As described in more detail below, each of the transmit antennas TX are arranged in dependence upon the effective spatial correlation of the set of receive antennas $RX_1$ to $RX_m$ for the given signal paths that each individual transmit antenna TX are emulating. The transmit antennas TX can also be arranged in elevation angle $\theta$ in dependence upon the associated effective spatial correlation. The transmit antennas TX may be arranged in elevation angle (also referred to as elevation height herein) in a variety of ways depending how the signals $S_i$ are distributed among transmit antennas TX. Since elevation spread is typically very small, there is generally a limited amount of error by approximating the effects using a limited number of transmit antennas TX.

Figure 4A:
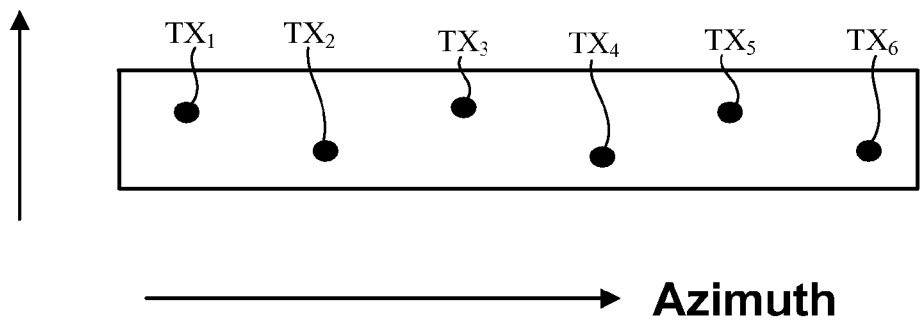
FIGS. 4A, 4B and 4C illustrate three example configurations for the arrangement of the transmit antennas in elevation.
Figure 4B:
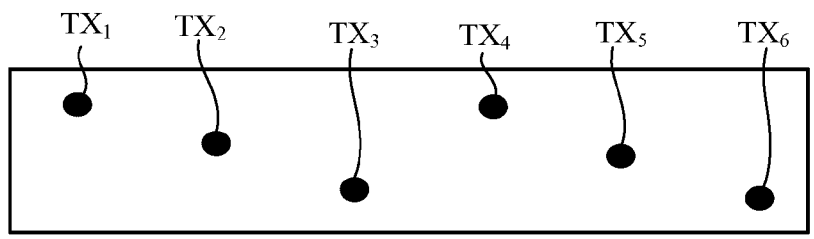
Figure 4C:
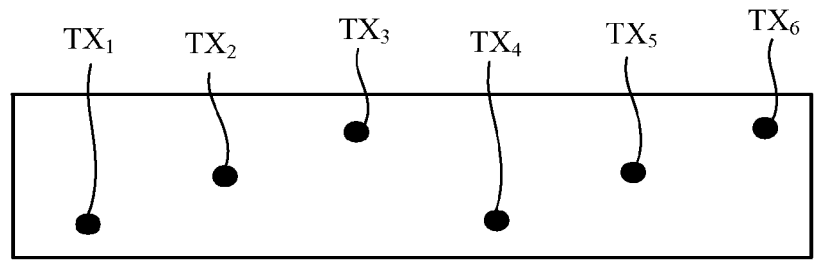

FIGS. 4A, 4B and 4C illustrate three example configurations for the arrangement of the transmit antennas TX in elevation angle or height. As described above, the arrangement of the transmit antennas TX in elevation will vary from embodiment to embodiment, depending upon the characteristics of the emulated wireless channel.

Referring back to FIG. 3, six transmit antennas labeled $TX_1$ to $TX_6$ are shown in the illustrated example. More generally, the number of transmit antennas TX is an integer value of 2 or more, and will vary from embodiment to embodiment depending upon the properties of the wireless channel including the number of paths being emulated and the acceptable difference between the effective and actual spatial correlations for the emulated paths.

In the example shown in FIG. 3, the characteristics of the transmit signals $S_1$ to $S_6$ provided to the six transmit antennas labeled $TX_1$ to $TX_6$ emulate a wireless channel having three different signal paths $Path_1$, $Path_2$, and $Path_3$. As illustrated and discussed in more detail below, the characteristics of the transmit signals $S_1$, $S_2$, and $S_6$ provided respectively to the transmit antennas $TX_1$, $TX_2$, and $TX_6$ emulate a first signal path $Path_1$ in the wireless channel. The characteristics of the transmit signals $S_2$, $S_3$, and $S_4$ provided respectively to the transmit antennas $TX_2$, $TX_3$, and $TX_4$ to emulate a second signal path $Path_2$ in the wireless channel. The characteristics of the transmit signals $S_4$, $S_5$, and $S_6$ emulate a third signal path $Path_3$ in the wireless channel.

In the example in FIG. 1, at least one transmit antenna TX is common among a pair of emulated signal paths. For example, transmit antenna $TX_6$ is common to both the first and third signal paths $Path_1$ and $Path_3$. In other embodiments, one or more of the signal paths may be defined using transmit antennas which are not shared. In one particular embodiment every signal path is defined using antennas which are not shared with any other signal path.

It will be understood that the system of FIG. 3 is not limited to the three signal paths or six transmit antennas shown in FIG. 1, and the actual number of signal paths and transmit antennas will vary from embodiment to embodiment, depending upon the particular details of the wireless channel being emulated.

As used herein, the term "signal component" refers to a portion of a signal transmitted by a given transmit antenna to emulate a particular signal path, where the transmission of all of the signal components emulates one signal path in the wireless channel. For example, in the case where three transmit antennas are used to emulate a signal path (e.g. $TX_1$, $TX_2$, and $TX_3$ to emulate signal path $Path_1$), the signal for this emulated path will have three signal components, one provided to each antenna. In embodiments described herein, the number of signal components (and thus the number of transmit antennas required) can be significantly less than the number of sub-paths which make up the particular signal path being emulated.

The number of transmit antennas used to emulate a given path is an integer value, for example in embodiments being X/4 or less, X/8 or less, and as another example being X/10 or less, where X is the number of sub-paths which make up the particular signal path being emulated. However, the reduction is not limited to even numbered ratios, e.g. the number of transmit antennas may be 2, 3, 4, 5 or a similar small number for each signal path.

In the example in FIG. 3 a single transmit antenna TX is illustrated at each particular transmit location. More generally, one or more transmit antennas may be arranged at each transmit location within the anechoic chamber 110. In embodiments the transmit antennas can be for example Vertically (V) polarized, or Horizontally (H) polarized, or a circularly polarized antenna, among others. For example, two or more antennas having the same or different polarizations may be arranged at each transmit location, such as V & H polarized antennas, V & V polarized antennas, right hand and left hand circular polarized antennas, etc. Each of the co-located antennas at a given transmit location may be connected to different outputs from the channel emulators of channel emulator circuitry 330, and thus could transmit simultaneously. As another example, a switch could be used that would select one antenna at the given transmit location.

The channel emulator circuitry 330 is coupled to the transmit antennas TX to provide a controlled lab test environment for emulating network communications with the set of receive antennas $RX_1$ to $RX_m$. The channel emulator circuitry 330 provides the ability to simulate radio channel characteristics such as fading, noise, etc. Embodiments of the channel emulator circuitry 330 are described in more detail below, and can include one or more Spirent SR5500 Wireless Channel Emulators manufactured by Spirent Communications of Rockville, Md., arranged to provide appropriate transmit signals $S_i$ to emulate the wireless channel in dependence upon the spatial correlation(s) of the set of receive antennas $RX_1$ to $RX_m$ for each of the emulated paths.

The system further includes network emulator circuitry 340 to simulate network conditions such as operating bands, air-interface protocols, downlink data rates, uplink data rates, code power, etc. The network emulator circuitry 340 can include one or more Spirent SR3420 Network Emulators manufactured by Spirent Communications of Rockville, Md., coupled to the channel emulator circuitry 330. In embodiments described herein, the network emulator circuitry 340 can include more than one network emulator to support MIMO, handover and/or interference testing.

The system 300 can also include a packet core network emulator to provide the ability to simulate network delay/latency, packet loss, packet jitter, etc. The system can also include an external storage device for archiving captured data.

The system 300 also includes a controller computer system 350 to initiate the test, to configure and remotely operate the various devices of the system 300 during the test, and to perform post-test processing of the measured results. The controller computer system 350 executes a computer program for communication and control of the operation of the various devices including computing the arrangement of the transmit antennas TX and the characteristics of transmit signals $S_i$ transmitted by the transmit antennas TX to the set of receive antennas $RX_1$ to $RX_m$ in dependence upon the spatial correlation(s) of the set of receive antennas $RX_1$ to $RX_m$ for the signal paths of the wireless channel being emulated (described in more detail below).

Figure 5:
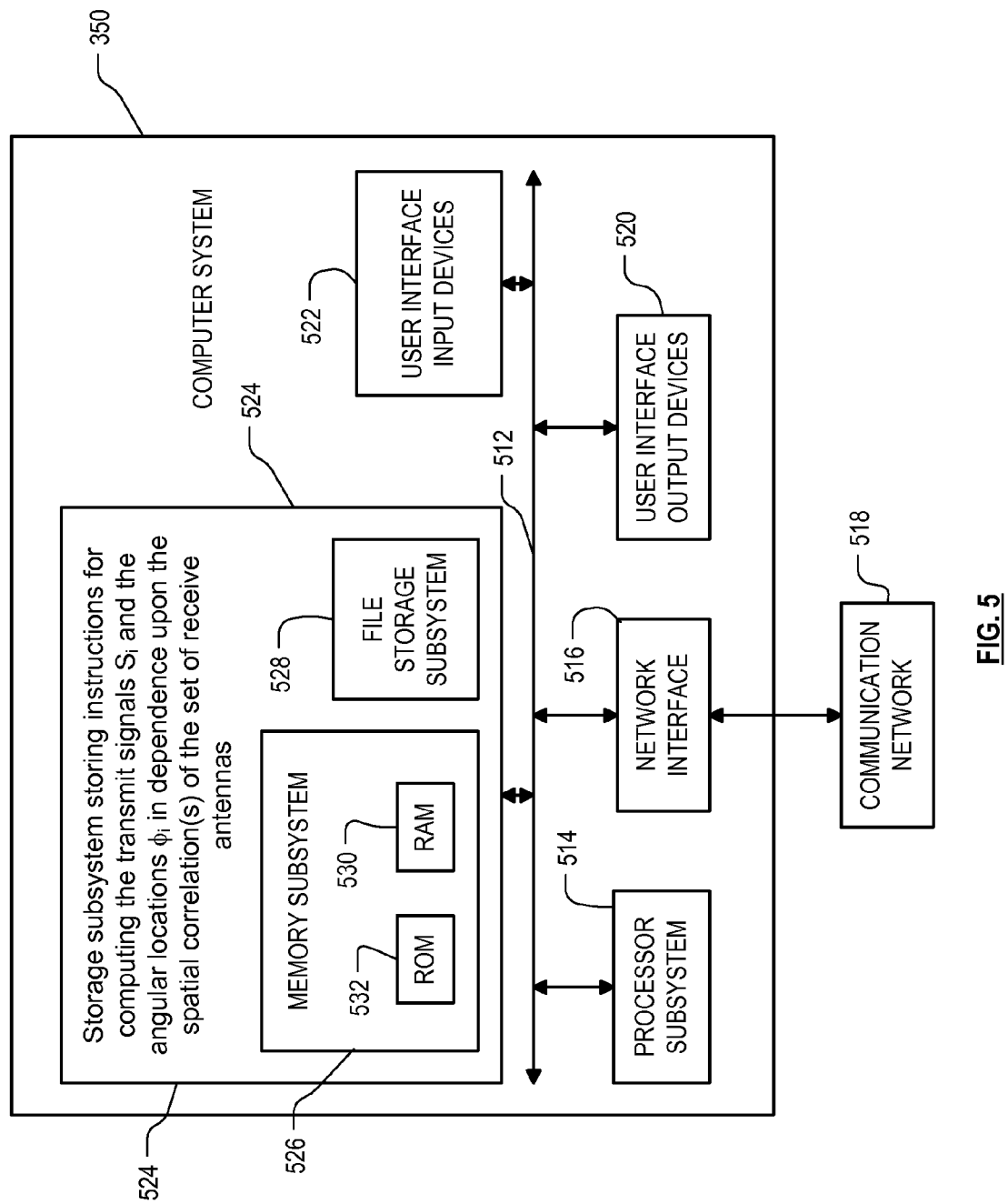
FIG. 5 is a simplified block diagram of an embodiment of the controller computer system of the system in FIG. 3.

FIG. 5 is a simplified block diagram of an embodiment of the controller computer system 550. The arrangement of the transmit antennas TX and the characteristics of transmit signals $S_i$ provided by the transmit antennas TX to the set of receive antennas $RX_1$ to $RX_m$ in dependence upon the spatial correlation of the set of receive antennas $RX_1$ to $RX_m$ for the emulated wireless channel can be implemented by a computer program stored in memory, or in other memory that can be distributed separately from the computer system as an article of manufacture. In the illustrated example in FIG. 5 these instructions are stored in storage subsystem 524 within the computer system 350.

Computer system 350 typically includes a processor subsystem 514 which communicates with a number of peripheral devices via bus subsystem 512. Processor subsystem 514 may contain one or a number of processors. The peripheral devices may include a storage subsystem 524, comprising a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks, including an interface to communication network 518, and is coupled via communication network 518 to corresponding interface devices in other computer systems. Communication network 518 may comprise many interconnected computer systems and communication links. These communication links may be wireline links, optical links, wireless links, or any other mechanisms for communication of information. While in one embodiment, communication network 518 is the Internet, in other embodiments, communication network 518 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells on a single integrated circuit chip with other components of the computer system.

User interface input devices 522 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 350 or onto computer network 518.

User interface output devices 520 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide for non visual display such as via audio output devices. In general, use of the term "output device" is intended to include all possible types of devices and ways to output information from computer system 350 to the user or to another machine or computer system.

Storage subsystem 524 stores the basic programming and data constructs that provide the functionality of certain embodiments of the present invention. For example, the various modules implementing the functionality of certain embodiments of the invention may be stored in storage subsystem 524. These software modules are generally executed by processor subsystem 514.

Memory subsystem 526 typically includes a number of memories including a main random access memory (RAM) 530 for storage and instructions and data during program execution and a read only memory (ROM) 532 in which fixed instructions are stored. File storage subsystem 528 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystems 528. The host memory 526 contains, among other things, computer instructions such as program code which, when executed by the processor subsystem 514, cause the computer system to operate or perform functions as described herein. As used herein, processes and software that are said to run in or on "the host" or "the computer", execute on the processor subsystem 514 in response to computer instructions and data in the host memory subsystem 526 including any other local or remote storage for such instructions and data.

Bus subsystem 512 provides a mechanism for letting the various components and subsystems of computer system 350 communicate with each other as intended. Although bus subsystem 312 is shown schematically as a single bus, alternative embodiments of the bus subsystem may use multiple busses.

Computer system 350 itself can be of varying types including a personal computer, a portable computer, a workstation, a computer terminal, a network computer, a television, a mainframe, or any other data processing system or user device. Due to the ever changing nature of computers and networks, the description of computer system 210 depicted in FIG. 2 is intended only as a specific example for purposes of illustrating the embodiments of the present invention. Many other configurations of computer system 210 are possible having more or less components than the computer system depicted in FIG. 2.

Aspects of the present invention may be practiced as a method or device adapted to practice the method. The invention may be an article of manufacture such as a media impressed with logic to carry out the steps of the method when executed by a computer.

Figure 6:
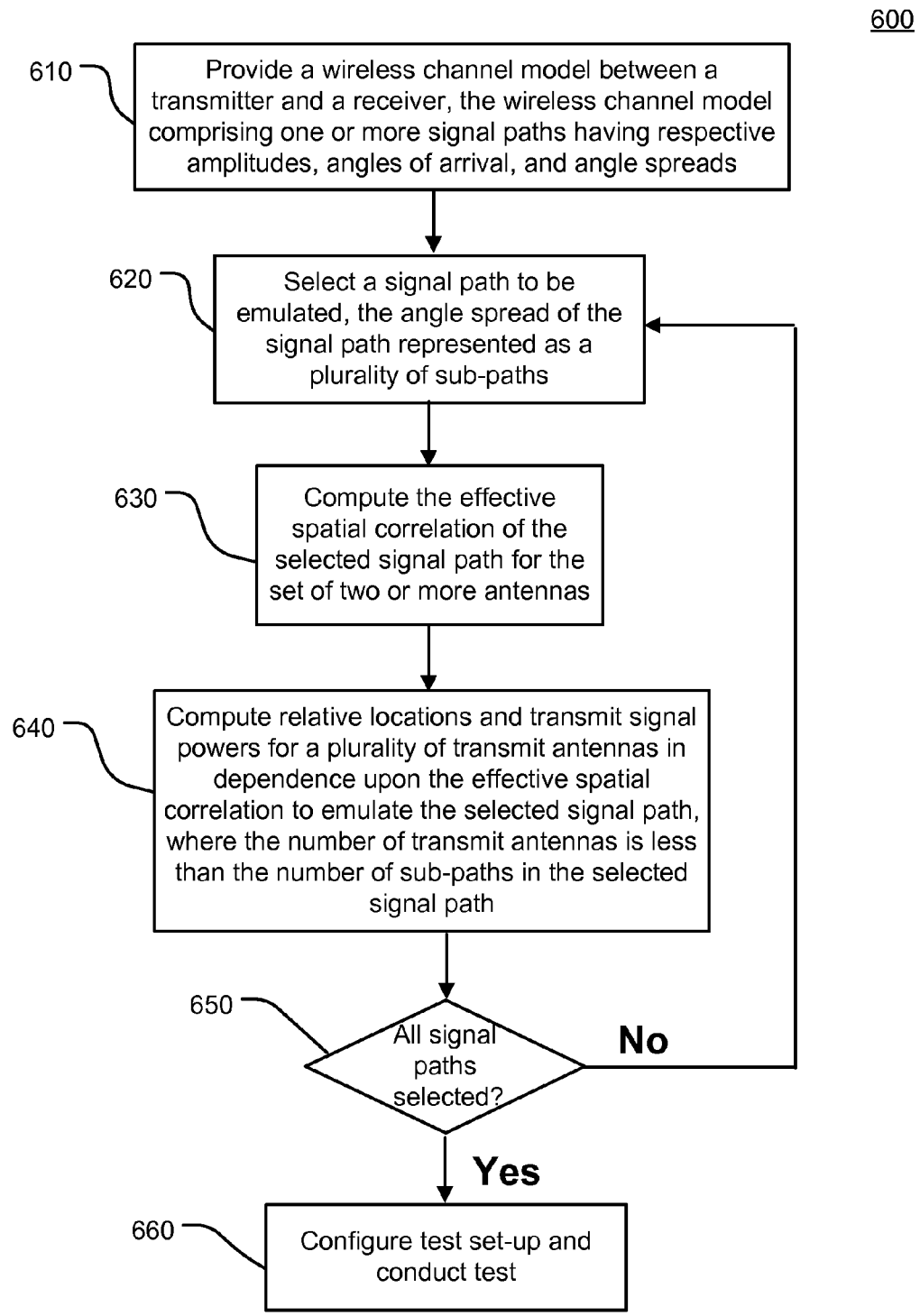
FIG. 6 is a flow diagram of an embodiment of a process which can be carried out by the computer controller system for computing the arrangement of the transmit antennas and the characteristics of the transmit signals.

FIG. 6 is a flow diagram of an embodiment of a process which can be carried out by the computer controller system 150 for computing the arrangement of the transmit antennas TX and controlling the characteristics of transmit signals $S_i$ provided by the circuitry 330, 340, and thus transmitted by the transmit antennas TX to the set of receive antennas $RX_1$ to $RX_m$, to emulate the one or more signal paths of a wireless channel between a transmitter and a receiver. As shown below, the process of FIG. 6 enables the replacement of individual unfaded or partially faded signal component sub-path sinusoids which make up the a given path in wireless channel with a smaller number of faded signals while accurately preserving the proper fading statistics and the spatial correlation at the receive antennas. As a result, the number of transmitting antennas can be small while still maintaining the desirable characteristics of the emulated wireless channel.

At block 600 a wireless channel model is provided between a transmitter and a receiver. The wireless channel model is characterized as one or more signal paths having respective amplitudes, angles of arrival, and angle spreads. The wireless channel may for example be specified based on a conventional channel model. As another example, the wireless channel model may be derived from or otherwise based on measured channel data. The angle spread of each path may for example be based on a discrete signal distribution, such as for example 20 discrete sinusoids approximating a Laplacian distribution in angle, or a continuous distribution like a continuous Gaussian. Other examples of the components of the paths include the SCM-E model and the Winner I & II models, which also use 20 discrete sinusoids. Also, the Jakes fader is a fading simulator which uses multiple sinusoids to emulate the fading signal, wherein as many as 32 sinusoids have been described in articles. The angle spread of the paths can be evaluated by measuring the correlation between antennas.

Next at block 620 a signal path in the channel model is selected for emulation. As described above, the angle spread of the signal path is represented as a plurality of sub-paths using a variety of different techniques.

Next, at block 630 the effective spatial correlation of the selected signal path for the set of two or more antennas is computed. As described above, the correlation representing the statistical similarity of the signals received on each antenna in the set and is dependent upon the antenna spacings and respective radiation patterns of the antennas in the set, as well as the particular details of the paths in the wireless channel, such as the angle of arrival (AoA).

At block 640, the relative locations and transmit signal characteristics for a plurality of transmit antennas to emulate the selected signal path are computed. The relative locations and the transmit powers of the transmit signal for the plurality of transmit signals are computed in dependence upon the effective spatial correlation computed at block 630, such that the difference between the effective spatial correlation and the actual spatial correlation provided by the transmit antennas is acceptably small. The locations of the transmit antennas may be constrained by the operator to match a predefined configuration of transmit antennas so that the resulting solution is compatible with a certain setup. For example, a fixed set of 6 antennas with angles 54.5 degrees apart might be used, or another configuration having a set of 8 antennas equally spaced apart with angles of 45 degrees might be used. Unequal spacing, or sub-sets of the available antennas with specific angles may also be used. In these examples the powers would be selected by the algorithm to obtain a solution given the implementation. This computation is described in more detail below with reference to FIG. 7.

Next, at block 650 the process continues back to block 620 to select another signal path for emulation, until all the signal paths have been emulated.

At block 660 the system 300 in FIG. 1 is configured and the test is conducted to emulate the wireless channel using the system 300. The configuration of block 660 includes the placement of the transmit antennas TX within the anechoic chamber, as well as providing configuration data to the channel emulator circuitry 330 and network emulator circuitry 340 to generate the appropriate transmit signals.

Path angle spreads vary. Although some models may use 35 degrees and other models may use 10 or 15 degrees. These values are chosen to be representative of the environment even though the angle spread is actually a distribution. This is shown in the plot from 3GPP standards Document TSGR1 #24 (02) 0408, showing the angle spread of the strongest received path. There is a tendency for weaker and higher delayed paths to have increased angle spread because they typically see more environmental scattering than the strong paths, which are more direct and experience less scattering. Therefore, it may be desirable to include support for more than one angle spread value, and actually have several implemented as shown for the 3 component example where different power and angles are used, or may be obtained by tailoring the powers distributed among a number of fixed antenna probes (which may be similar to the OFDM case discussed below). Paths, which are specified in terms of their delay, may be transmitted from various transmit antennas, with their angles and powers properly considered to emulate paths with different angles of arrival and angle spreads.

Figure 7:
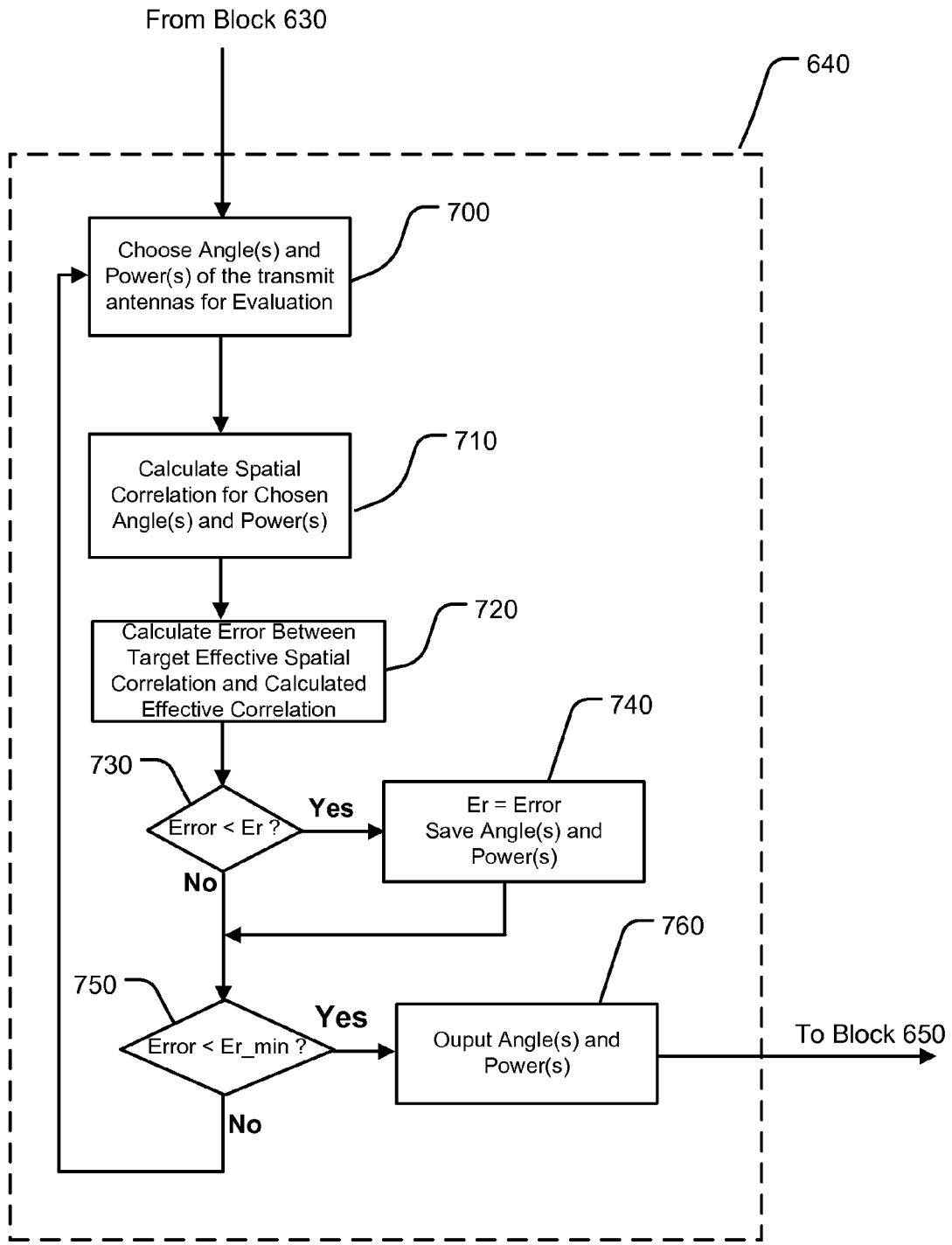
FIG. 7 is a flow diagram of an embodiment of a process for computing the relative angles and transmit signal powers for the plurality of transmit antennas to emulate the selected signal path.

FIG. 7 is a block diagram of an embodiment of block 640 in FIG. 6 for computing the relative locations and transmit signal powers for a plurality of transmit antennas.

At block 700, particular angle and transmit powers for each of the transmit antennas are chosen for evaluation. In embodiments, the number of transmit antennas may be, for example, 2, 3, 4, 5, 6, or similar. The angles and transmit powers may be chosen for evaluation, for example, using a random search, a gradient search, by stepping linearly across a range of angles and a range of powers in a search for the best result, or by choosing angles and powers for some of the transmit antennas and searching for the angles and powers of the remaining antennas. Initial values may also be used to improve the calculation based on the weighting of the samples from the PDF of the path's PAS for the given angle of arrival relative to the transmit probe angles. Other techniques may also be used.

Depending upon the desired test set-up configuration, the characteristics of the signal paths of some of the transmit antennas may be dependent upon one another, which provides further constraints on the selection of angle and transmit powers. For example, in one embodiment described below, duplicate copies of the same faded signals are distributed to three antennas using couplers, attenuators, and cables or other phase shifting devices.

In embodiments in which three transmit antennas emulate a particular signal path, one angle and one power may be chosen in some embodiments since this defines a triangular symmetric distribution (discussed more below) and may speed up the searching process. As another example, with four transmit antennas, two angles and two powers may be chosen, while for greater than four antennas a random search may be preferable. With two antennas, the powers and angles could be stepped linearly across a range of angles and a range of powers, or as another example a random search could be performed.

Next, at block 710 the spatial correlation for the chosen angle(s) and power(s) in block 700 for the selected signal path is calculated. At block 720 the error between the target effective spatial correlation computed in block 630 and the spatial correlation calculated in block 710 is calculated.

It will be understood that the calculation of the error of block 720 may be carried out in a variety of different ways. For example, the error could be a least-mean square over a particular range of AoA angles of the target and computed spatial correlation, where the difference between the two curves for each of n sample angle values are individually squared and then summed over the number of samples. This value would be normalized, i.e. divided by the number n in order to make it independent of the number of samples used in the calculation. In one embodiment the maximum acceptable normalized least mean square error may be less than or equal to 0.05, and more preferably less than or equal to 0.01, for the case of using 10 quantized angles over the range of $0-\pi/2$ or $0-\pi$, for example taken every 10 degrees, and a value as low as possible is desirable. It is possible for the solution to achieve 0.00001 in some configurations.

In some embodiments the number n of sample angle values may be, for example, 10 for covering a fraction of the full azimuth, or as other examples may be 40 to cover the full azimuth. It may also be convenient to specify a value for every 5, 10, 15, or 20 degrees. The particular range of AoA angles over which the error is calculated may be, for example, 90 degrees or less. Other examples of the particular range can include the full azimuth of $0-2\pi$ and can include also the full or partial range of elevation angles when calculating the error for a vertically separated set of transmit antennas. Similar quantizing of the range of angles may be done for the elevation case.

As another example, the error of block 720 can be calculated as the maximum difference between the two curves over the particular range, or as another example be an average difference over the particular range of AoA angles. In one embodiment the maximum difference may be less than 10%, for example being less than 0.1%. In one embodiment, the average difference may be less than 1%.

The error of block 720 may also be a non-linear weighting of the difference between the two correlation values for the n sample angles to further optimize the fit. It will be understood that other techniques for calculating the error of block 720 may also be used. It will further be understood that there a range of possible solutions that will create a match, which is substantially the same in terms of producing a spatial correlation that is close to the target spatial correlation. Thus a range of possible solutions is possible using the concepts of optimization described herein.

Next, at block 730 it is determined whether the error of block 720 is less than a error Er. Initially, Er is preferably a large number so that the first time block 730 is reached the error of block 720 is less than Er, so that the first time through the loop the Er is set equal to the error of block 730 at block 740 for the further iterations.

Next, at block 750 it is determined whether the error of block 730 is less than a predetermined minimum acceptable error Er_min. The minimum acceptable error Er_min will vary from embodiment to embodiment, and the value chosen depends upon the technique used for determining the error in block 720. If the error of block 720 is greater than Er_min, the process continues back to block 700 where new angles and powers are chosen and the process is repeated. If the error of block 720 is less than Er_min, at block 750 the angles and powers for the transmit antennas used to emulate the selected signal path are output and the flow chart continues to block 650 in FIG. 6. If a random search is used, the stopping criteria in block 750 may be based on running the algorithm for a specified length of time to find the lowest possible error in that time period.

It will be understood that the determination the relative angles and transmit powers of the transmit antennas may be carried out using various other types of techniques, such as adjusting the error calculation to use a non-linear weighting of the curve to further optimize the fit, or terminating the search in different ways such as using a counter to stop after some number of samples are evaluated, or using a gradient search to improve the efficiency of the algorithm.

FIGS. 8-10 illustrate example matching results using the techniques described herein which significantly reduce the number of transmit antennas for emulation of a given path. As shown below, the results show excellent matching of the correlation.

Figure 8B:
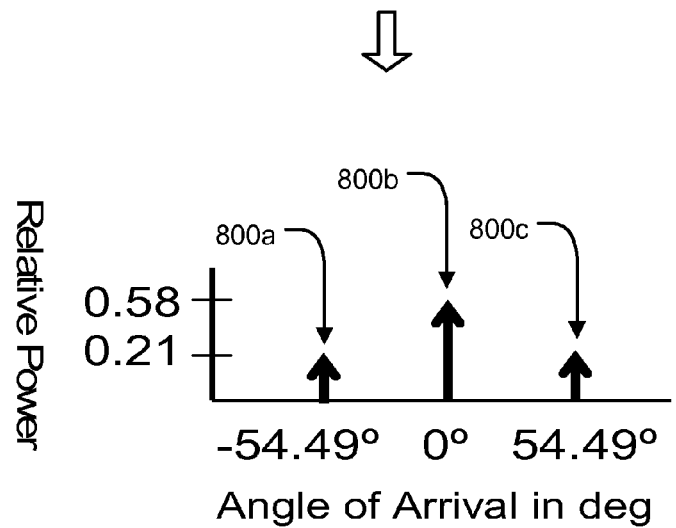

In FIGS. 8A-8E illustrates a first example of the matching, in which the correlation due to a standardized 20 sub-path 35° azimuth spread model as shown in FIG. 8A is matched using three signal components 800a, 800b, 800c as shown in FIG. 8B, for a pair of onmi-directional receive antennas having an antenna spacing of $\lambda/2$.

As shown in FIG. 8B, the relative powers and angles in azimuth are 0.207 and −54.49 degrees for signal component 800a, 0.586 and 0 degrees for component 800b, and 0.207 and 54.49 degrees for component 800c.

Figure 8C:
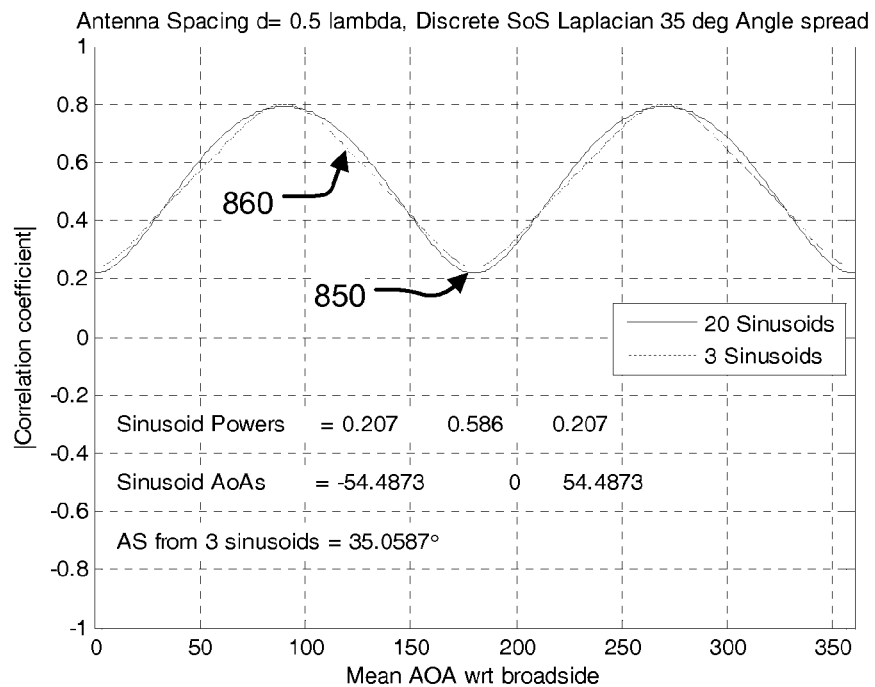

Curve 850 in FIG. 8C shows the magnitude of the target correlation for the 20 sub-paths, and curve 860 shows the magnitude of the correlation using the three components 800a, 800b, 800c of FIG. 8B. As can be seen in the results in FIG. 8C, a good match is obtained.

Figure 8D:
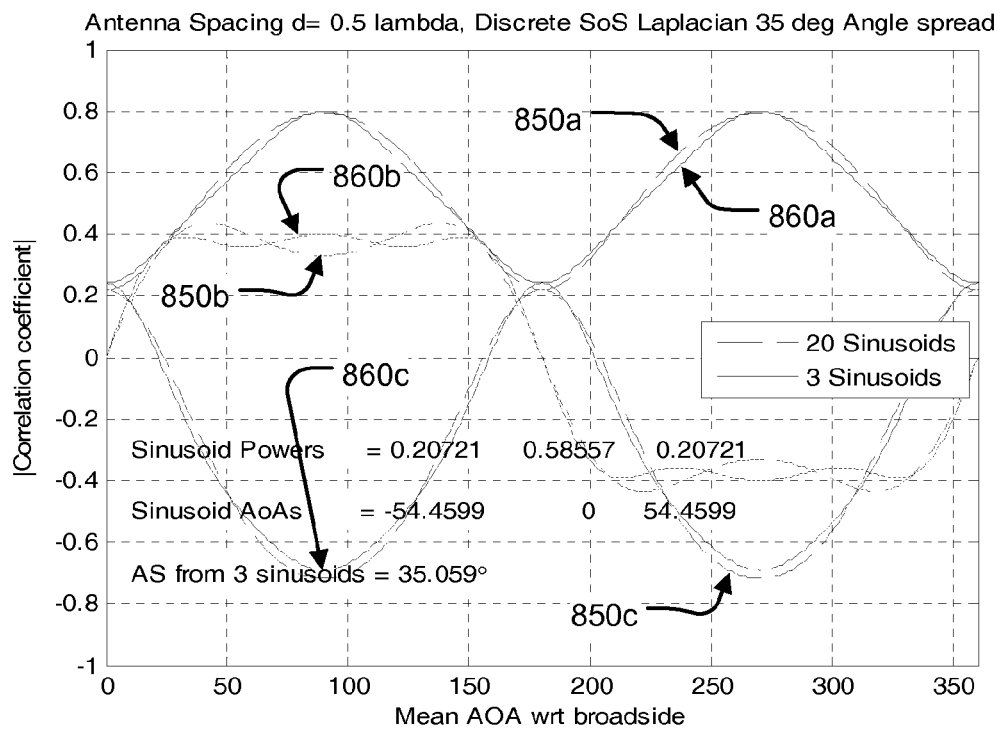

The matching results also match for the underlying real and complex values, as shown in FIG. 8D. In FIG. 8D, curves 850a and 860a are the magnitudes of correlation of the 20 sub-path and the three signal components respectively, curves 850b and 860b are the imaginary parts of correlation of the 20 sub-path and the three signal components respectively, and curves 850c and 860c are the real parts of correlation of the 20 sub-path and the three signal components respectively.

Figure 8E:
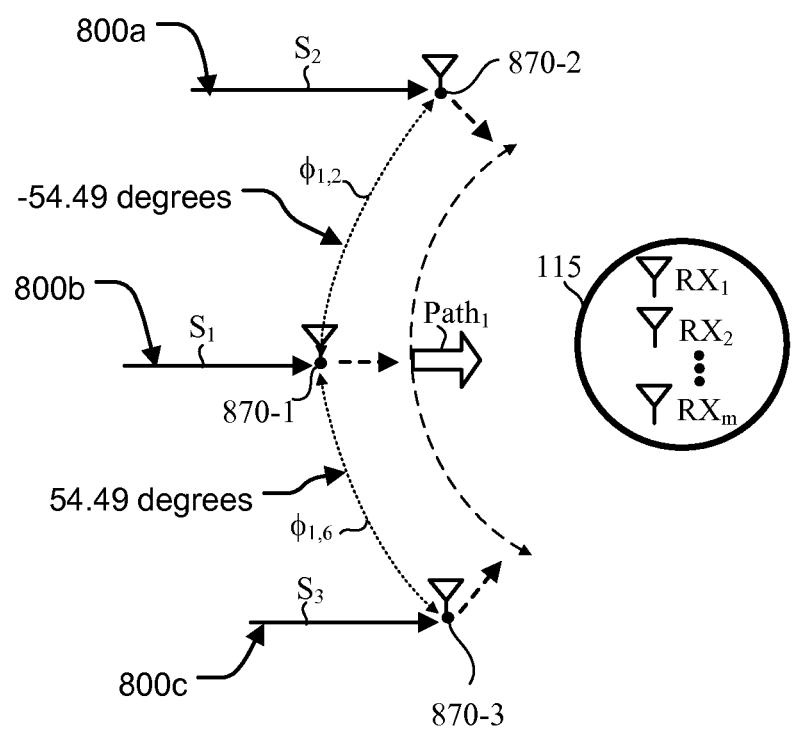

FIG. 8E shows a simplified top view of a portion of the test set-up configuration for emulation of the given path using the three components 800a, 800b, 800c mapped to three transmit antennas 870-1, 870-2 and 870-3 for transmitting to the set of receive antennas $RX_1$ to $RX_m$.

Figure 9A:
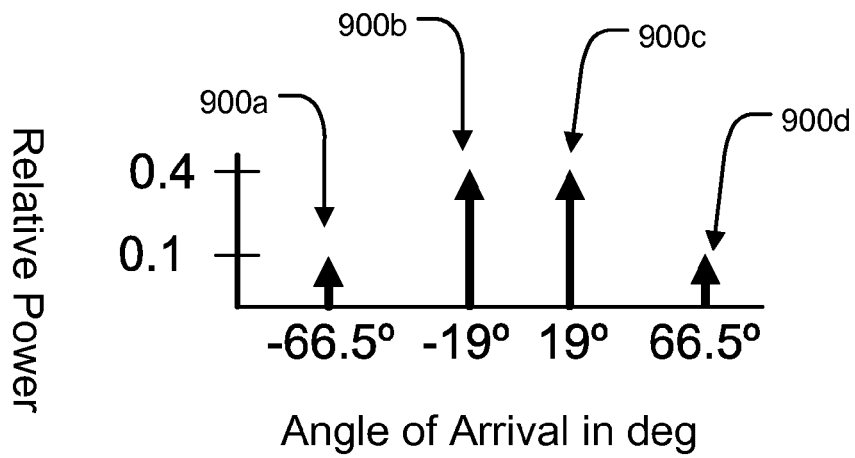
FIGS. 9A-9C illustrate a second example of emulating a signal path using the techniques described herein.
Figure 9B:
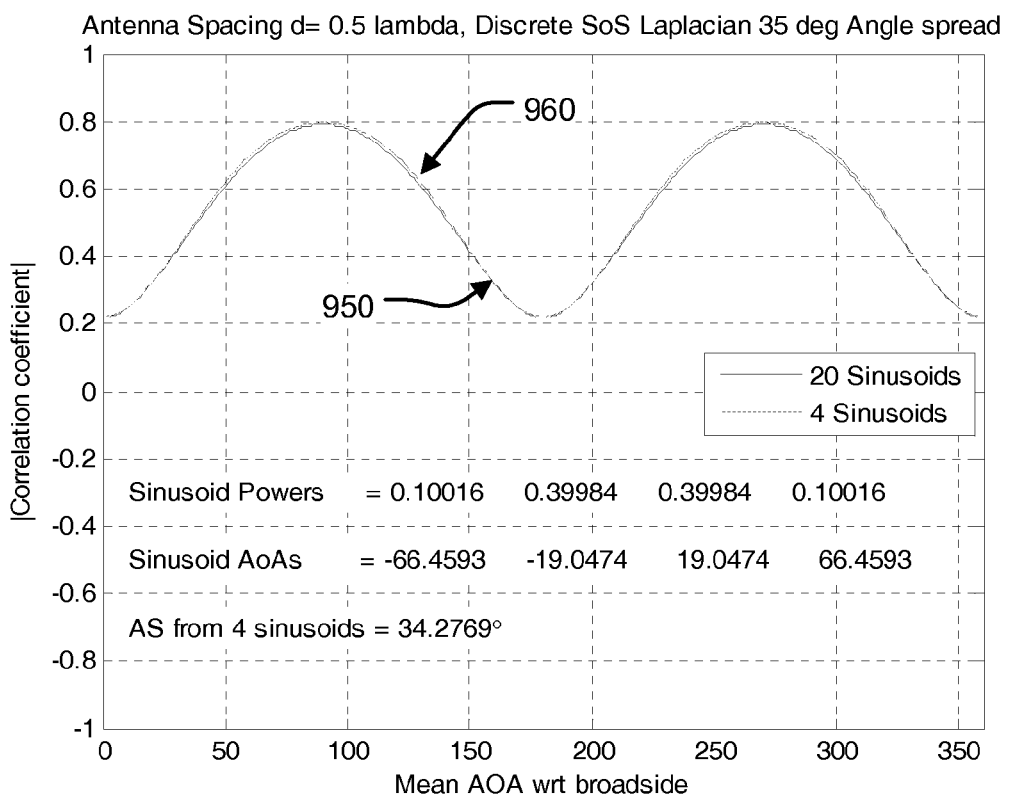
Figure 9C:
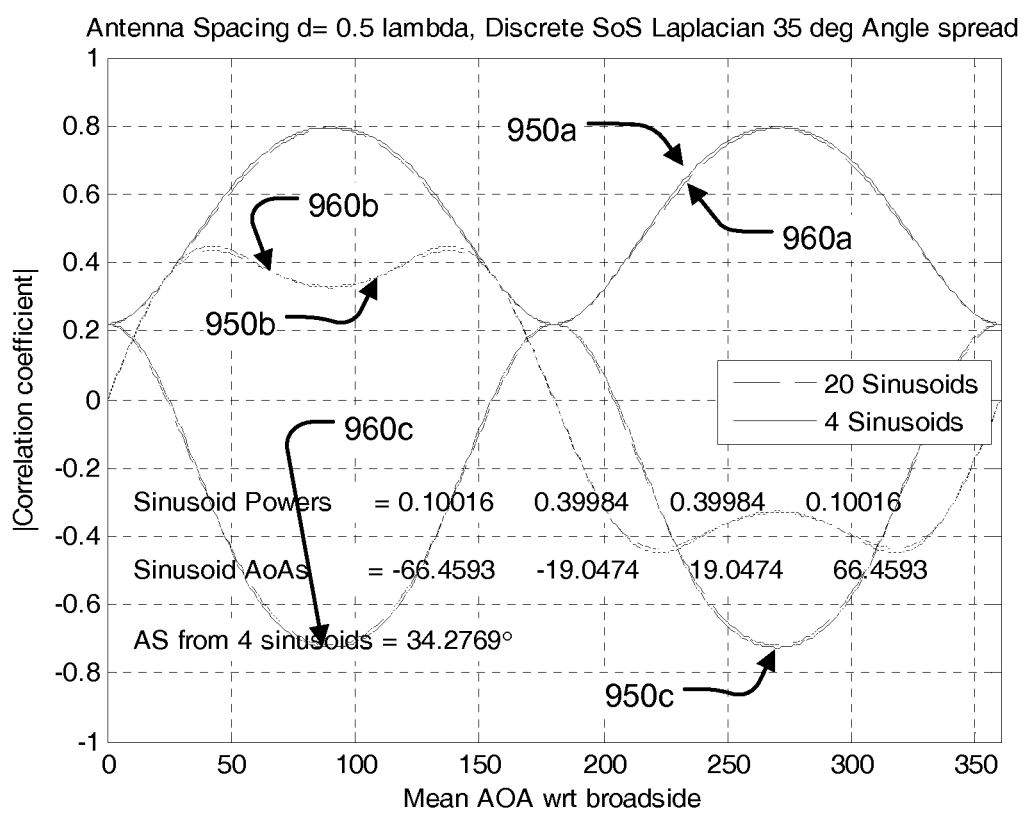

In FIGS. 9A-9C matching of the correlation using the 20 sub-paths is shown using four signal components 900a, 900b, 900c, 900d. In FIG. 9A the relative powers and angles are 0.10016 and −66.5 for component 900a, 0.39984 and −19.0 for component 900b, 0.39984 and 19.0 for component 900c, and 0.10016 and 66.5 for component 900d.

Curve 950 in FIG. 9B shows the magnitude of the target correlation for the 20 sub-paths, and curve 960 shows the magnitude of the correlation using the four signal components 900a, 900b, 900c, 900d. As can be seen in the results in FIG. 9B, a good match is obtained.

The matching results also match for the underlying real and complex values, as shown in FIG. 9C. In FIG. 9C, curves 950a and 960a are the magnitudes of correlation of the 20 sub-path and the four signal components respectively, curves 950b and 960b are the imaginary part of correlation of the 20 sub-path and the four signal components respectively, and curves 950c and 960c are the real part of correlation of the 20 sub-path and the four signal components respectively.

Figure 10A:
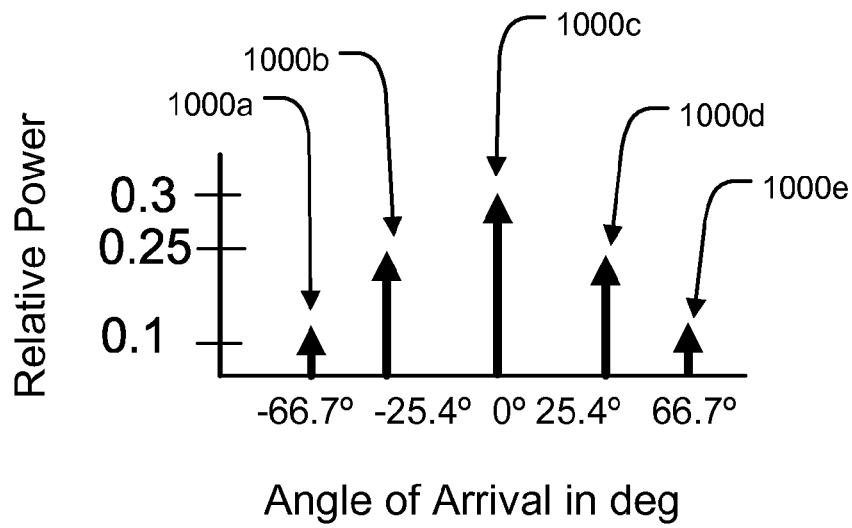
FIGS. 10A-10C illustrate a third example of emulating a signal path using the techniques described herein.
Figure 10B:
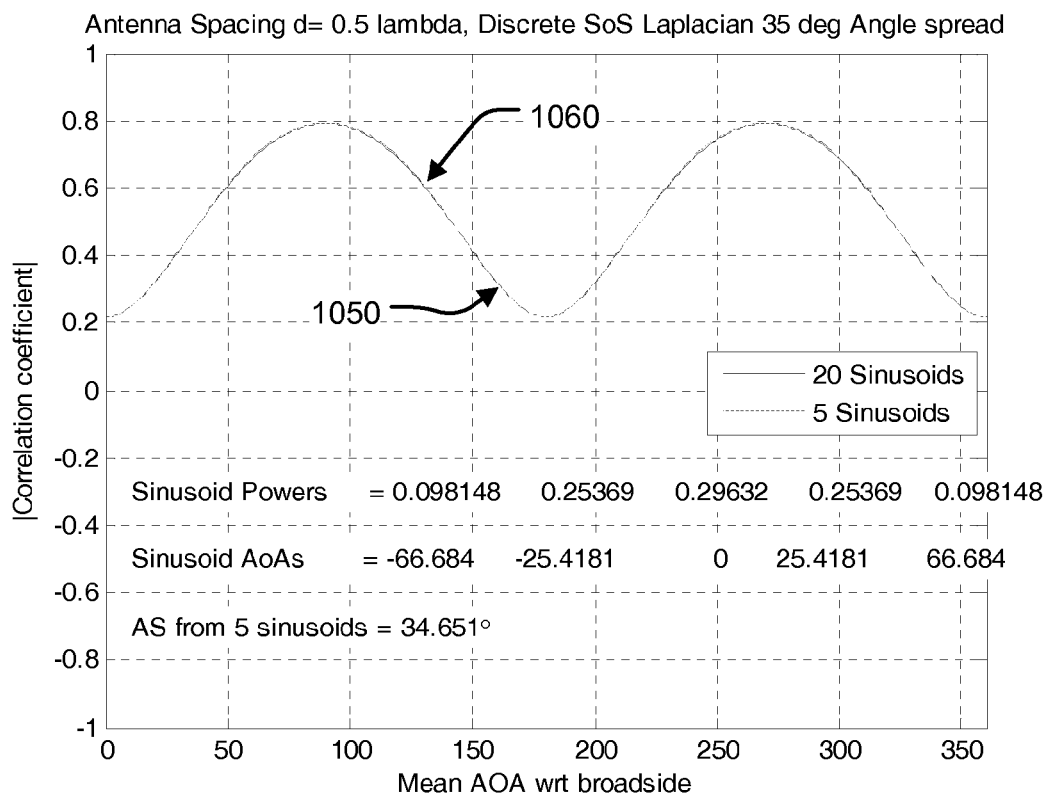
Figure 10C:
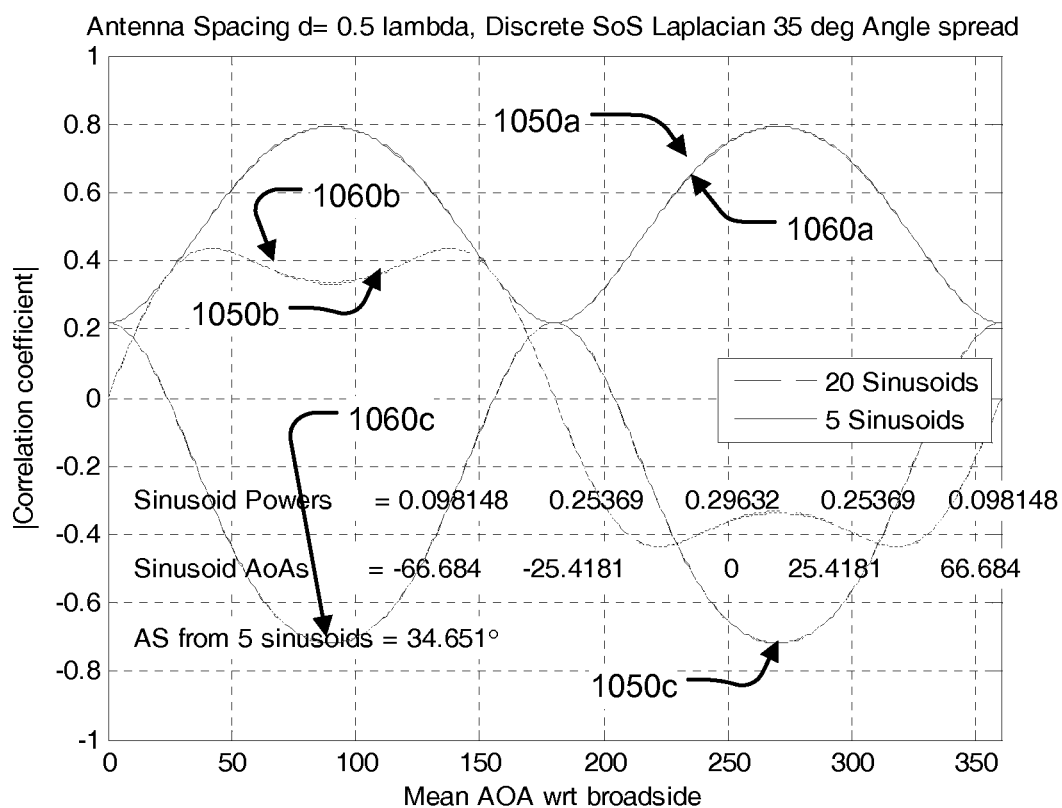

In FIGS. 10A-10C matching of the correlation using the 20 sub-paths is shown using five signal components 1000a, 1000b, 1000c, 1000d, 1000e. In FIG. 10A the relative powers and angles 0.098 and −66.7 for component 1000a, 0.254 and −25.4 for component 1000b, 0.296 and 0 for component 1000c, 0.254 and 25.4 for component 1000d, and 0.098 and 66.7 for component 1000e.

Curve 1050 in FIG. 10B shows the magnitude of the target correlation for the 20 sub-paths, and curve 1060 shows the magnitude of the correlation using the five signal components of FIG. 10A. As can be seen in the results in FIG. 10B, a good match is obtained.

The matching results also match for the underlying real and complex values, as shown in FIG. 10C. In FIG. 10C, curves 1050$a$ and 1060$a$ are the magnitudes of correlation of the 20 sub-path and the five signal components respectively, curves 1050$b$ and 1060$b$ are the imaginary part of correlation of the 20 sub-path and the five signal components respectively, and curves 1050$c$ and 1060$c$ are the real part of correlation of the 20 sub-path and the five signal components respectively.

The powers associated with the mappings in FIGS. 8B, 9A and 10A each have their unique delay as specified by the wireless channel model being emulated, and are scaled in power based on their power delay profile and combined to produce the correct distribution of powers and delays on each transmit antenna.

It will be understood that the resultant component angles and powers in the FIGS. 8-10 are examples, and the angles and power for the various components will vary from embodiment to embodiment. Additionally, in FIGS. 8-10 the paths were emulated using 3, 4, and 5 components respectively. More generally, the number of components may be 2 or more, depending upon the target correlation and the acceptable error.

Figure 11:
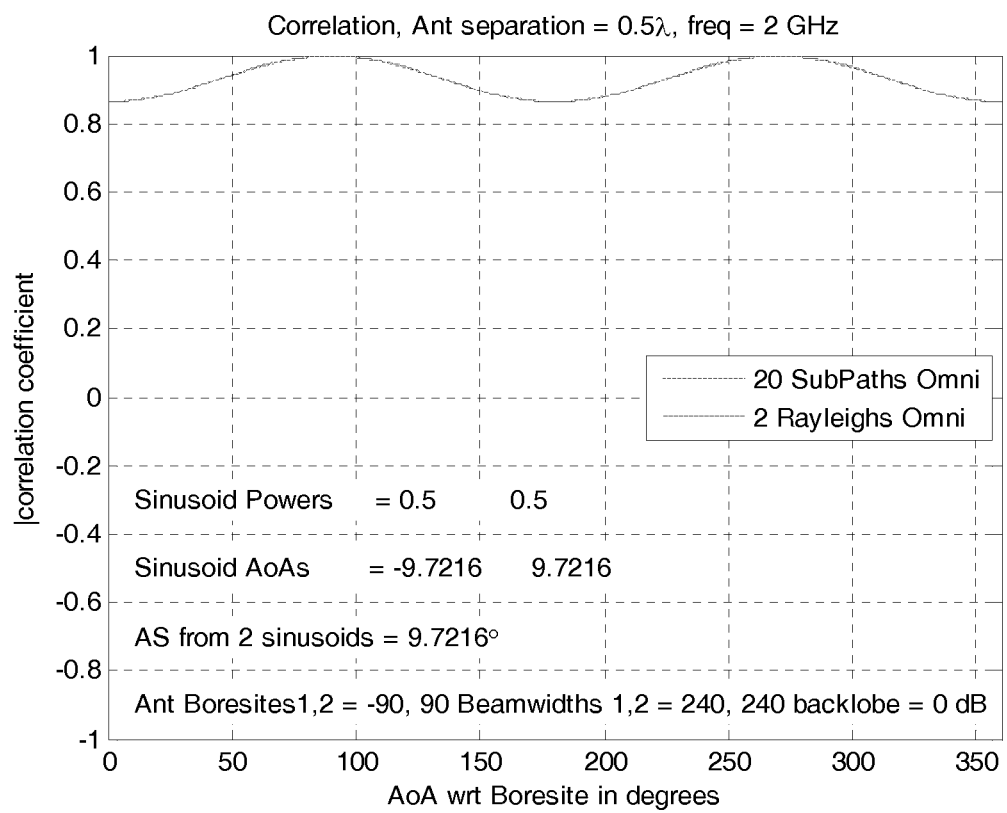
FIG. 11 illustrates a fourth example of emulating a signal path using the techniques described herein.

For example, FIG. 11 shows the correlation using two components to match a 20 sub-path 10° azimuth spread path model. As can be seen, excellent matching is achieved. The path AoA was shown to be aligned to the direction of one of the antennas in some examples and in-between the transmit probes in other examples. By constraining the transmit antenna probe angles, the AoA can be selected at a particular value relative to the transmit antenna probe angles.

In embodiments the amplitude and angle of arrival of the signal paths in the wireless channel can include temporal and spatial characteristics, so that the channel characteristics are dynamically varied during testing, to emulate for example the spatial movement of the device under test relative to a signal source. For example, the spatial movement can include applying a Doppler spectrum to the signal components based on a virtual spatial movement parameter stored in memory 524. In such a case a Doppler shift can be applied to each of the sub-path sinusoids which make up the various signal components of a path to define a Doppler spectrum. The virtual spatial movement parameter represents spatial movement of the device under test relative to the emulated signal source. For example, the virtual spatial movement parameter may include a velocity indication with a speed and direction, and may include the specification of Doppler shifts for particular sub-paths. For the purposes of modeling, the Doppler applied to a particular sub-path may be set independently from the geometric relationships normally associated with the Doppler frequency.

It has been found that if the signal components are un-faded sinusoids like that in FIG. 8A, the combination of such a small number of signal components (for example, 3 as in FIG. 8B) may not reproduce a desired fading signal as there may not be enough signals to combine to achieve the statistical behavior desired.

Figure 12:
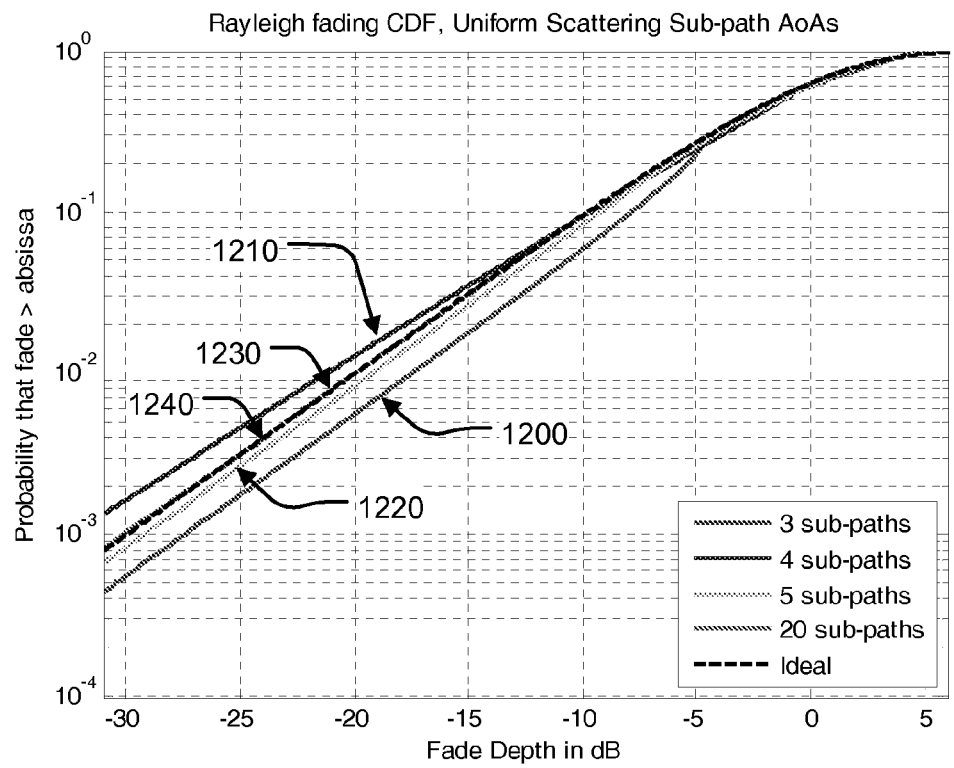
FIG. 12 shows the sum-of-sinusoids signal envelope CDF for 3 sub-paths, 4 sub-paths, 5 sub-paths, 20 sub-paths, and the ideal.
Figure 13:
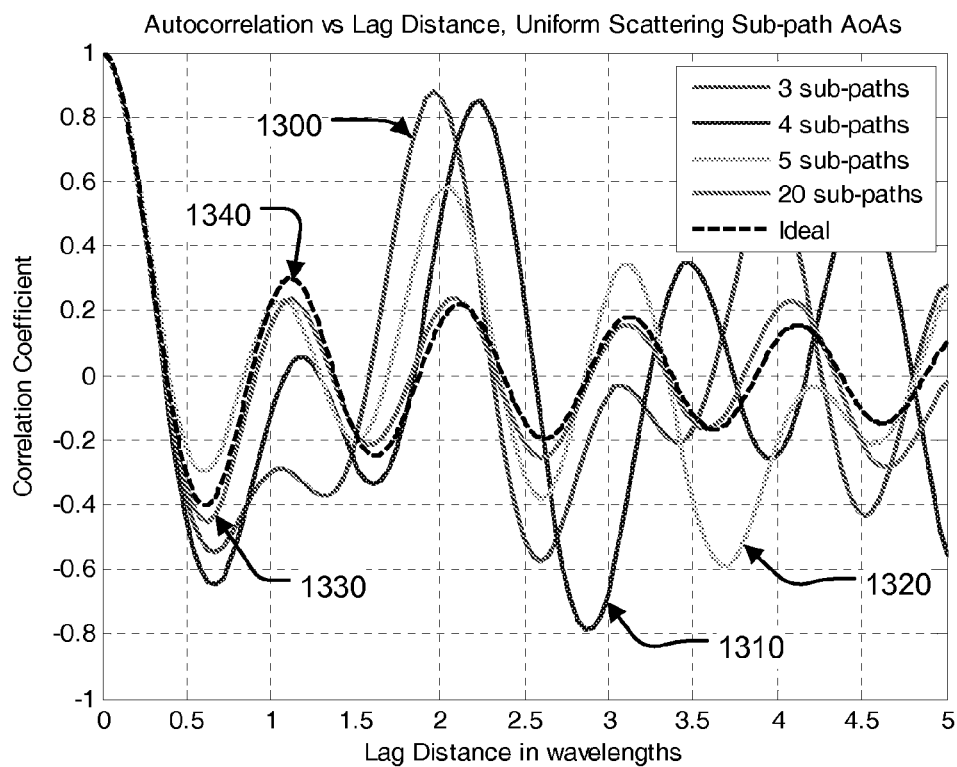
FIG. 13 shows the sum-of-sinusoids signal autocorrelation versus lag distance for 3 sub-paths, 4 sub-paths, 5 sub-paths, 20 sub-paths, and the ideal.

This is shown in FIGS. 12 and 13, which show the fading performance compared to the ideal theoretical values.

FIG. 12 shows the sum-of-sinusoids signal envelope CDF for 3 sub-paths (curve 1200), 4 sub-paths (curve 1210), 5 sub-paths (curve 1220), 20 sub-paths (curve 1230), and the ideal (curve 1240).

FIG. 13 shows the sum-of-sinusoids signal autocorrelation versus lag distance for 3 sub-paths (curve 1300), 4 sub-paths (curve 1310), 5 sub-paths (curve 1320), 20 sub-paths (curve 1330), and the ideal (curve 1340).

Figure 14:
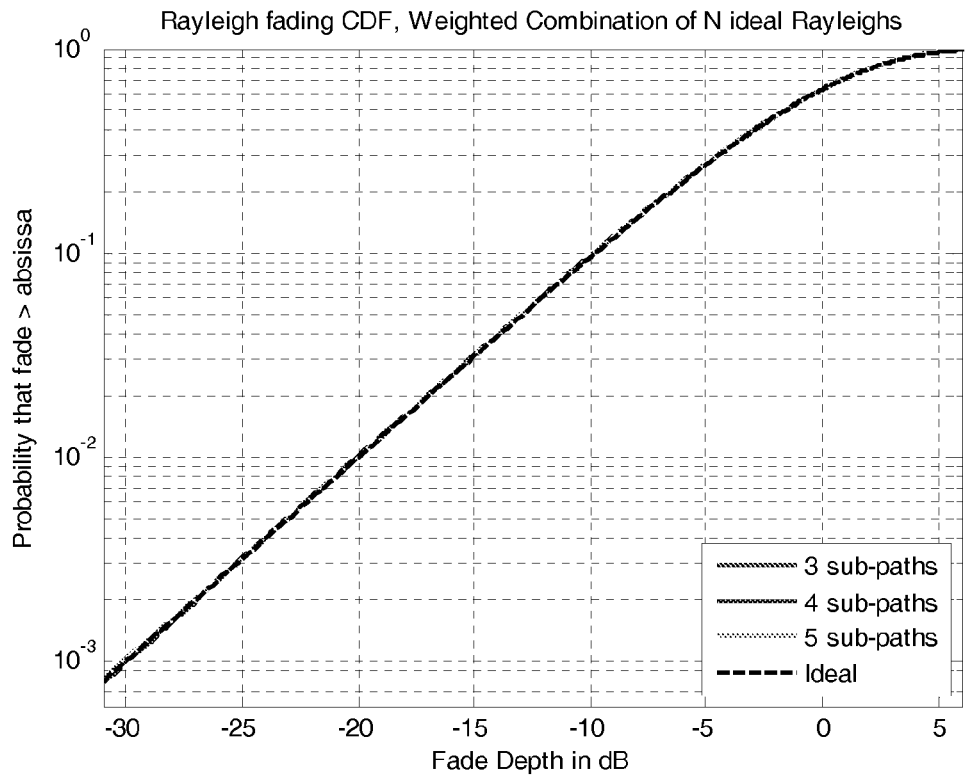
FIG. 14 shows the Rayleigh fading CDF with independent fading of the power weighted components.
Figure 15:
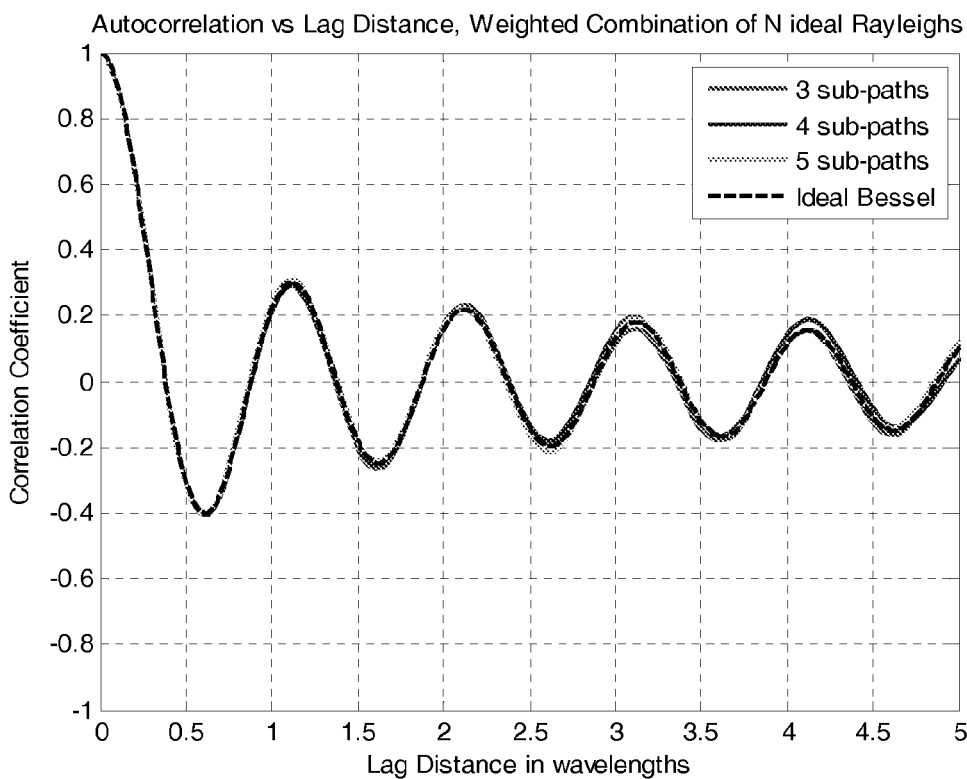
FIG. 15 shows the autocorrelation versus lag distance with independent fading of the power weighted components.

In contrast, as shown in FIGS. 14 and 15, by independently fading the small number of power weighted components, the resulting behavior matches the ideal performance. The fading can be generated for each transmit antenna probe within the channel emulator, and this may be accomplished by a sum-of-sinusoids approach or a filtered noise approach. The sum-of-sinusoids employs a large number of sinusoids, e.g. 20, wherein each is modified slightly from the carrier frequency by a Doppler shift to produce the Rayleigh fading behavior. The filtered noise approach uses randomly generated quadrature Gaussian noise samples, which are filtered using a Doppler shaped filter. Although ideal Rayleigh fading is the most popular test case and was therefore chosen as an example for this analysis, Ricean or other types of fading may be used. Recorded data may also be played back.

If the RX antennas are not omni-directional as many models assume, some differences may be observed in the correlation versus angle. An omni-directional antenna was used to obtain the three component results in FIG. 9A. It is desirable that the 20 sub-path sum-of-sinusoids model and the three weighted Rayleigh faded component model also behave the same way when different antenna patterns are observed. For this purpose a hypothetical model was developed to use an example, wherein the antenna gain varies significantly and is different for each of the antennas. It is found that the 20 sub-path sinusoid case and the 3 signal-component case both match for an omni-directional case and when different antenna patterns are observed. Therefore, the three-signal component model is capable of being used in place of the sub-path sinusoid model in an OTA measurement system, and thereby reducing the number of transmit antennas from 20 to 3 to characterize a given signal path.

A path, which may normally be modeled with 20 equal powered sinusoids arriving from a set of specific angles of arrival as illustrated in FIG. 8A, was shown to be adequately modeled with a 3 power weighted independently Rayleigh faded signal components having a specific angle distribution.

Figure 19:
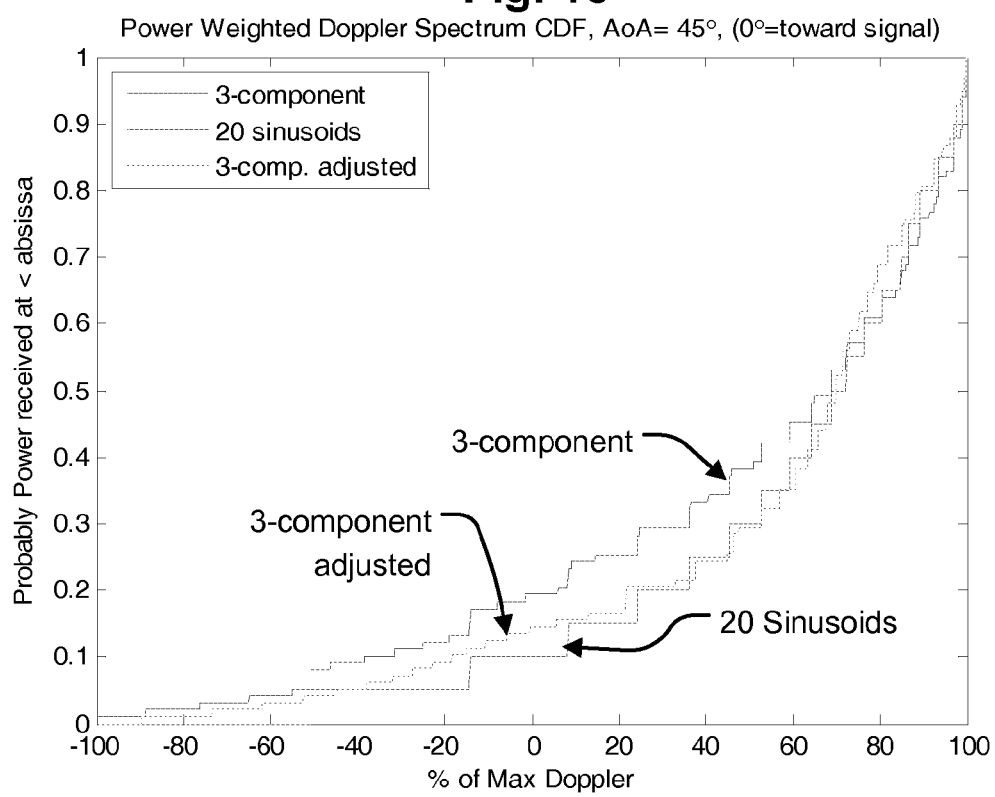

Referring back to the power delay profile example from FIG. 1, each path is mapped to a set of transmit antennas to represent each path in the wireless channel model. In one such example, each of the 6 paths are shared between 6 transmit antennas illustrated in FIG. 3. Since the spacing in this example is 54.49 degrees, a limited number of antennas can be obtained to cover approximately a full circle. Similar angle spacings and powers may also produce a good match to the desired response, so these numbers may vary. Also, this example was shown using a Laplacian Power Azimuth Spectrum, but other distributions may be used as well including a Gaussian distribution. The Gaussian will result in a similar correlation behavior, but result in slightly different angles and powers in the three component model. As shown in FIG. 19, the different delays representing the different paths may have components that are transmitted from the same antenna.

Figure 16:
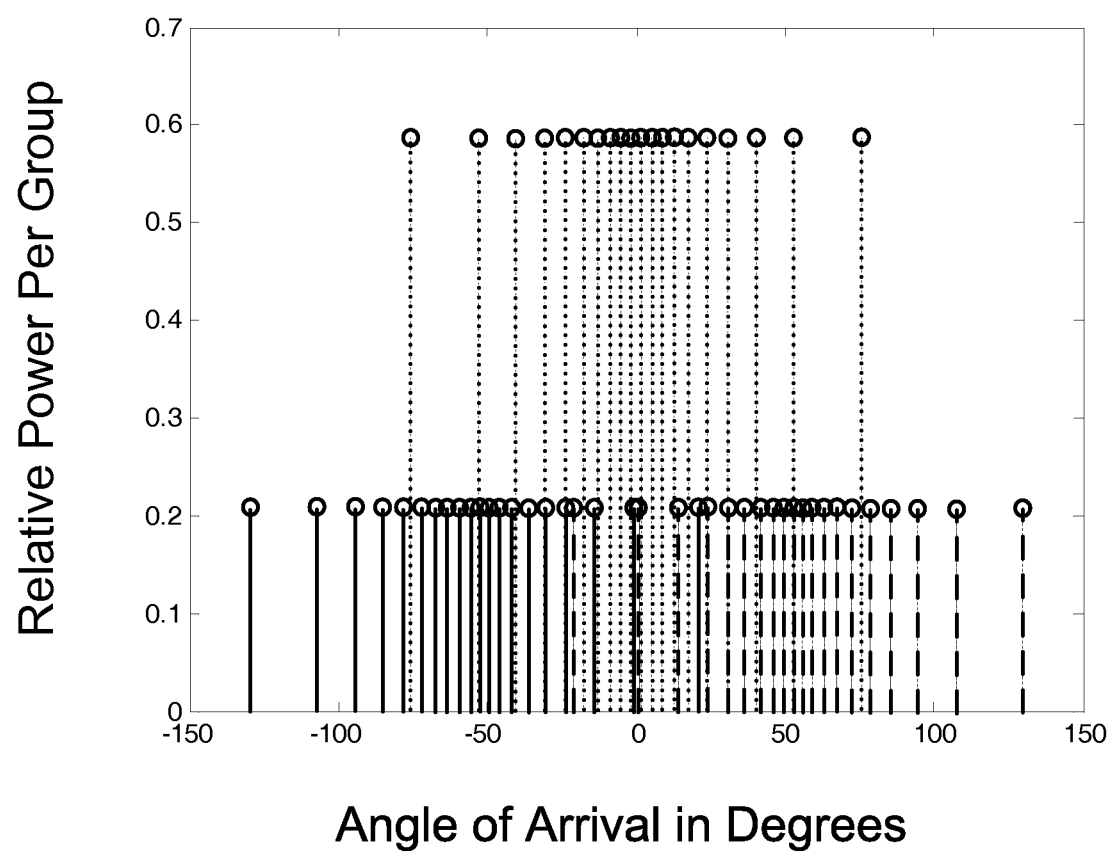
FIG. 16 illustrates a sum-of-sinusoids model used to calculate the Doppler for each sinusoid.

The Doppler on each path component can be set consistent with the angle to the assumed movement of the device-under-test. The Doppler is calculated for each sinusoid in the sum-of-sinusoids model as shown in FIG. 16. Each of the independently faded signals are supplied from the 3 antennas to the test receiver via the paths indicated in FIG. 3. In this example, the fading signals are made up of a set of 20 sub-paths each (See FIG. 16), although different numbers of sub-paths may alternatively be used. The Doppler shift of each of the 20 sub-path sinusoids is based on the equation:

$$f_n = \frac{v}{\lambda}\cos(\alpha_n)$$

where $\lambda_c$=carrier wavelength
$f_n$=doppler frequency
$\alpha_n$=incident angle at the device-under-test
v=assumed velocity of the device-under-test The assumed velocity of the device-under-test is used to create the fading signal to emulate the movement, where the fading is a function of the assumed velocity and direction. The angle between the direction of travel and the arriving virtual sub-path sinusoids, (virtual in that they are Doppler shifted based on the range of angles associated with their angle spread even though they do not exist at that angle, but are transmitted from one of the transmit antennas) is used to define the Doppler frequency of each. The virtual path is used to create the fading signal which will be supplied to the corresponding antenna.

Figure 17:
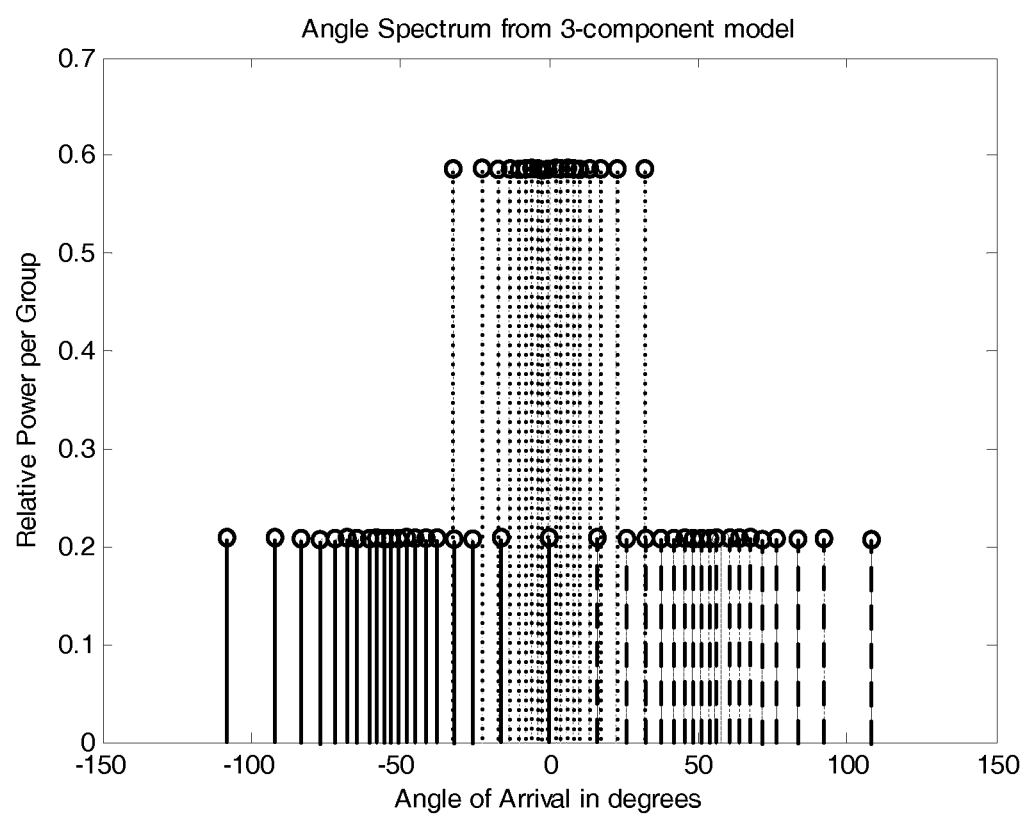
FIG. 17 illustrates a sum-of-sinusoids model having a more narrow angle spread than that in FIG. 16.

From FIG. 16 it is noted that equal angle distributions with AS=35 degrees spread out the signal power across a larger angle than the center path alone. For this reason the spreading may be set smaller to obtain an improved match for the combined signal. FIG. 17 shows a more narrow Doppler mapping using AS=25 degrees for the left and right distributions, and an AS=15 for the center one. Note that these alternative Doppler mappings do not affect the spatial correlation, which is set by the average power and angle spread of each transmit antenna.

Figure 18:
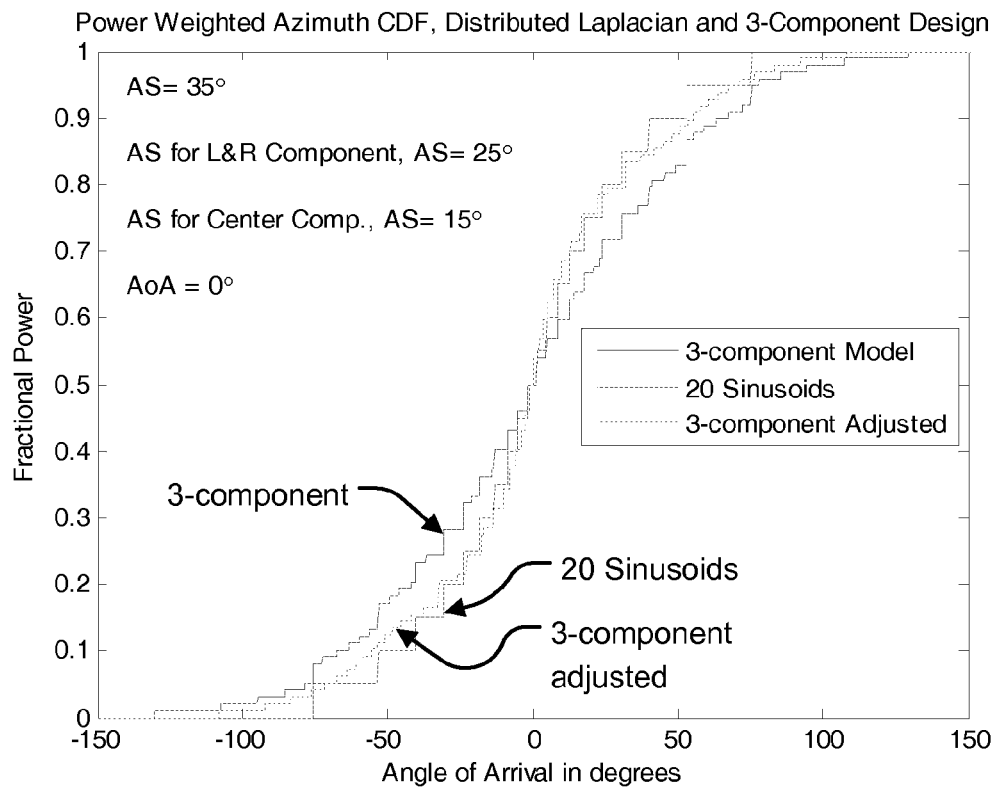
FIGS. 18, 19 and 20 show a CDF of the accumulated power versus angle for various directions of travel.
Figure 20:
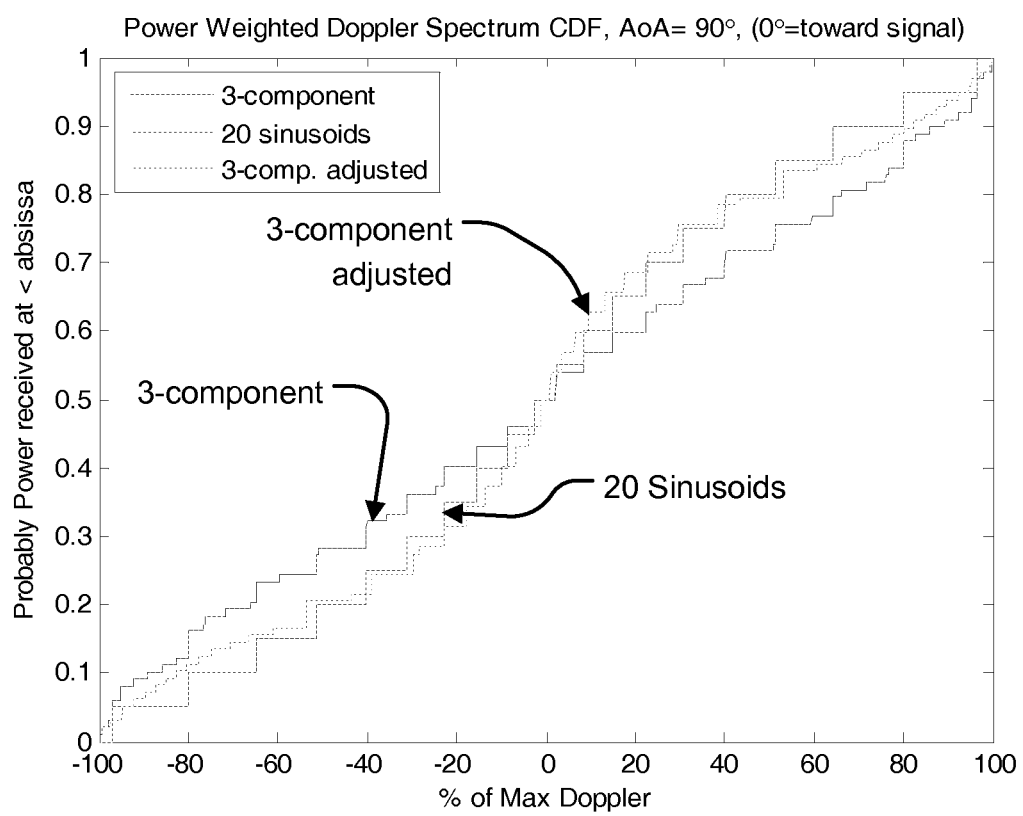

FIGS. 18, 19, and 20 show a CDF of the accumulated power versus angle for various directions of travel, and with smaller spreading on the 3-component adjusted model of FIG. 17, a better fit to the original signal was obtained.

As a check of the temporal behavior, a fading generator was setup with the reference configuration of the adjusted 3-component model having angle spreads of 25 degrees, 15 degrees, and 25 degrees for the left, center, and right components. The fading generator was run for approximately 50,000 fades and both configurations produced nearly identical numbers of fades for various assumed directions of travel. Therefore, based on matching the fading behavior, and matching the signal distribution, the Doppler model aligns well with the original signal.

Although a 35 degree angle spread is shown in this example, other angle spread values are also used and will have different specified powers, angle separations, and optimized adjustment values to obtain the best match.

FIGS. 17-20 show an example of adjusting the angle spread in order to achieve a Doppler mapping that approximately matches the Doppler spectrum of the original 35 degree angle spread signal. Alternatively, the angle spread of each transmitted component may be held constant at the value of the original emulated path, and the assumed average angles of arrival may be modified, i.e. reduced to an angle near or a match to the average angle of arrival of the emulated path. This technique also provides a match to the desired Doppler spectra.

In embodiments the average AoA of a path can be the center of the 3-antenna triplet since it is may be a symmetric distribution of the signal components.

Figure 21:
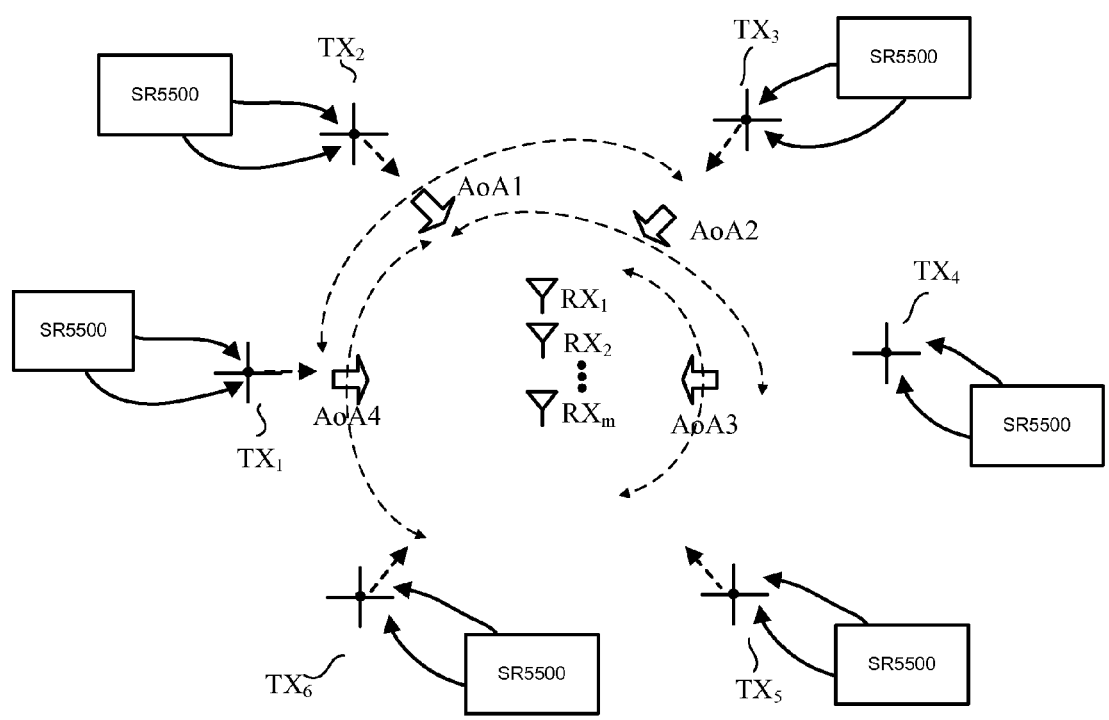
FIG. 21 is a simplified block diagram of one embodiment of a system as described herein for emulating a wireless channel.

One example of using a limited number of transmit antennas is shown in the simplified system block diagram shown in FIG. 21. In this example the AoAs are quantized to 4 specific directions of arrival, where each antenna in this example is separated by 54.49 degrees. Although more antennas could be interspersed to achieve additional angles of arrival, it is desirable in some embodiments to keep the number low. This embodiment in FIG. 1 has an emulated channel for each antenna, with pairs of antennas at each angle of arrival. The antenna pairs are shown to be cross-polarized pairs in this example, but other antenna arrangements could alternatively be used, such as V & H polarizations, V & V, right hand circular, left hand circular, and others. More generally, a single V antenna, or a H antenna, or a circular polarized antenna could be used. As another example a switch could be used that would select a V or H or a given type of antenna (so that there is only one input if a switch is used) for each antenna location. In FIG. 21 these antennas are connected to two different outputs from the fading channel emulator (SR5500) and could be operated simultaneously. Or using a switch they could be operated one at a time.

The emulated channel pair may be correlated within the channel emulator to represent the spatial correlation at the BS, and may further be tailored to match the type of BS antennas, separation, polarization, and angle spread assumptions used.

Other models, such as the Winner II model, specify an angle spread that is different for environments including Urban, Suburban and Rural, and different cellular configurations such as macro-cells and micro-cells. The range of values specified in this model is σ=10 to 22 degrees.

Figure 22:
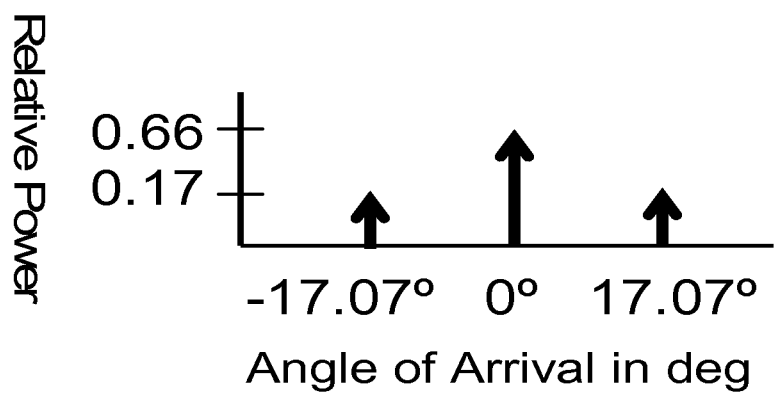
FIG. 22 illustrates an example of a 3-component signal using power weighted independent Rayleigh faded components.

An example of a 3-component signal using power weighted independent Rayleigh faded components that matches the spatial correlation for the 20 sinusoid model with an angle spread of σ=10 degrees is shown in FIG. 22.

Figure 23:
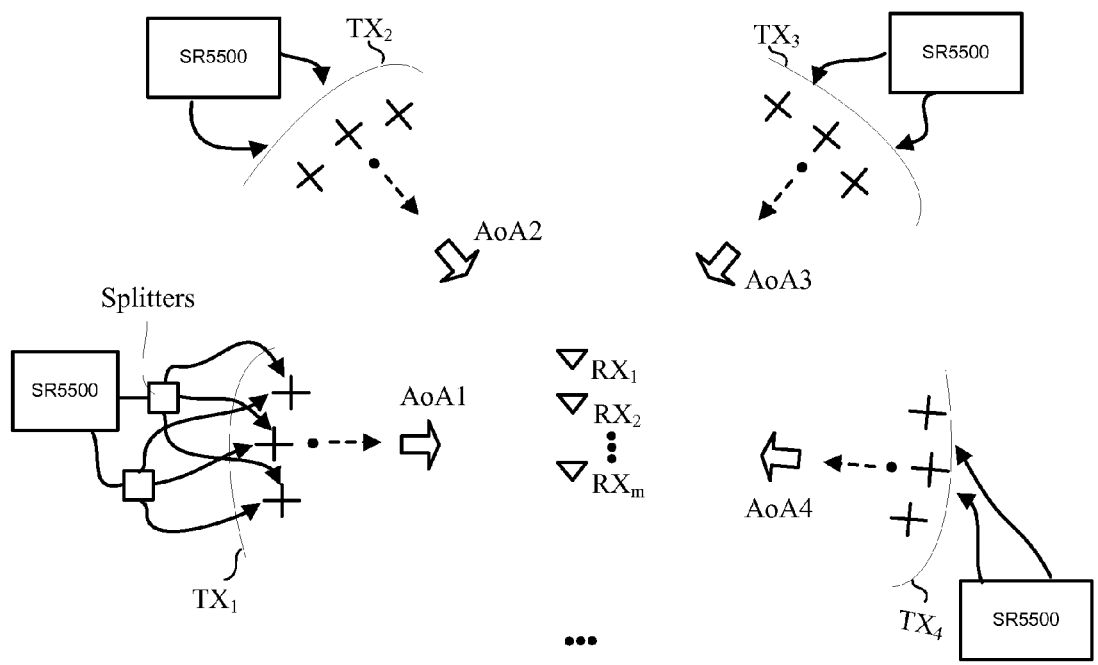
FIG. 23 is a simplified block diagram of one embodiment of a system as described herein for emulating a wireless channel.

In some embodiments such as narrow angle spreads, which require more narrow antenna spacings, it may be desirable to implement a configuration like that shown in FIG. 23. In FIG. 23 each path is defined by a 3 antenna triplet. In this case, there may be a gap in angle between a particular path and an adjacent path. This implementation requires fewer channel emulators and thus reduces hardware and complexity.

In this alternative implementation, duplicate copies of the faded signal are distributed to the three antennas to form a specific angle spread characteristic. This is done via couplers and attenuators to split the signal and scale the relative powers, although other means may also be used. The behavior of the three-component emulated angle spread can be adjusted to match the correlation obtained from a known antenna array response. Since this method uses duplicate copies of the faded signal to be added in combination, the correlation characteristics versus angle are mathematically different than the combination of three independent random variables as used above. In this case, the phase may be important in specifying the 3-components. This phase may be produced by the electrical length of the cables, or by phase shifting devices, or by other means. By controlling the phase, as an example a match to the 10 degree angle spread is obtained in FIG. 24 (the curve labeled 'Directional #3' is an omni).

Figure 24:
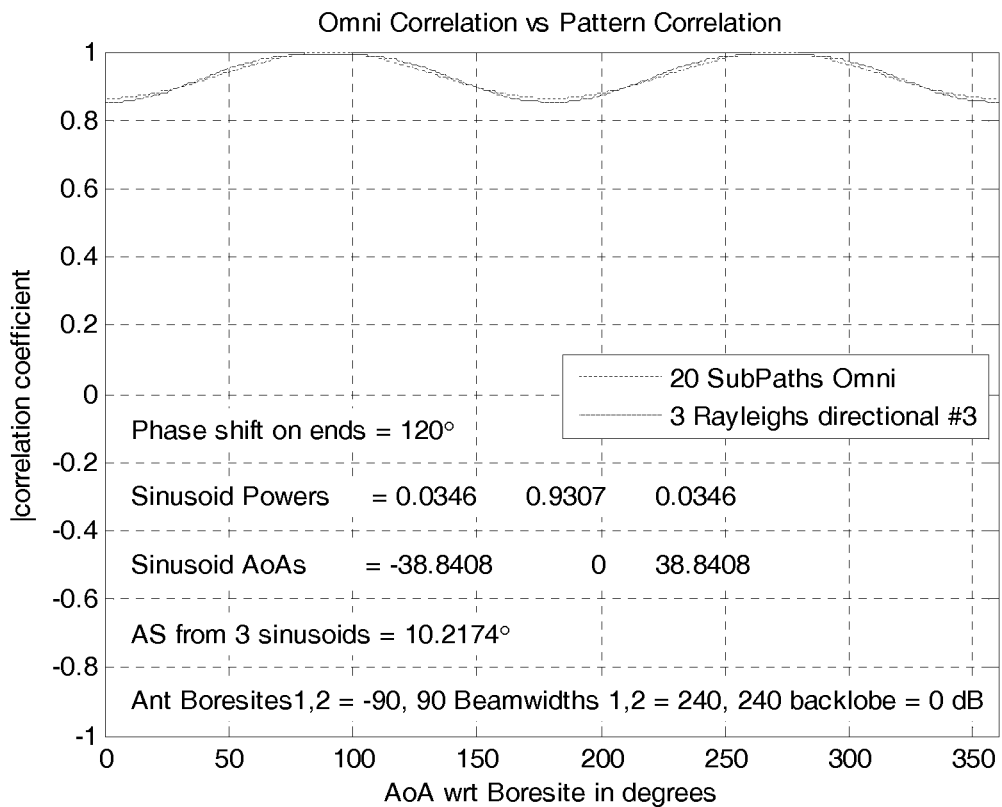
FIG. 24 illustrates an example of the effective spatial correlation using a 3-component signal with a phase shift applied on the ends.
Figure 25:
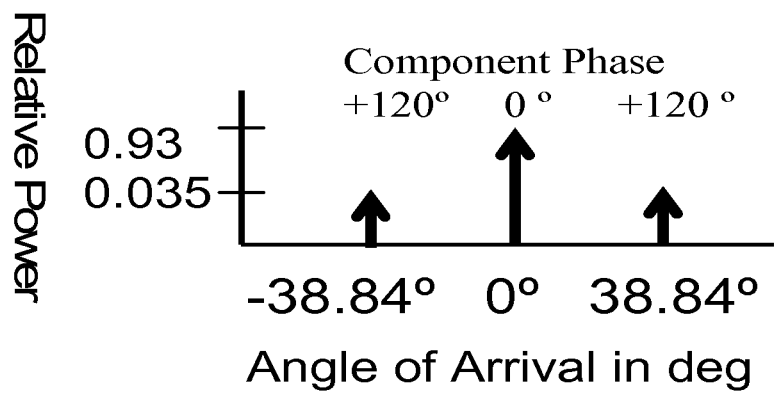
FIG. 25 illustrates the three components used to obtain the computed results in FIG. 24.

FIG. 25 illustrates the 3 components used to obtain a match of FIG. 24 to the correlation of the reference array using the 10 degree angle spread and the 3-components include a relative phase as well as a magnitude and angle. These values represent one possible solution, and there are other combinations of angles, powers, and phases that will also represent a good solution for the given angle spread. Also, if other distributions or angle spreads are desired, a different arrangement including additional components could be used without deviating from the concepts of this invention.

Thus, in this example, the path angles of arrival are quantized to a relatively small number, which is 4 in this example. Many test conditions are concerned with typical and extreme test cases, and the exact number of AoAs and their angles may be chosen. In such a case, particular test cases can be chosen based on the channel that is obtained, and the ability to generate the channel condition. Therefore, many times arbitrary AoAs are not required.

Referring back to the embodiment of FIG. 23, the Doppler is based on the identical sub-components on each of the N−1 (e.g. 3−2=2) additional antenna(s) because the splitter provides replicas of the signal to each of the antennas with some phase shift that can be controlled by the cable length or other means. The receive antennas will observe a signal that is made up of 20 (for example) discrete Doppler frequencies, where each of the 20 frequencies has a portion of its power coming from each of the N (3 in this example) antennas. Since the Doppler shift on each of the 20 sub-components of the fading signal are set in the instrument, and will be identical at each antenna (after the splitter), the Doppler shifted values are based on a set of virtual angles that match the original test signal. For the splitter case, the virtual angles and the resulting Doppler shifts will be the same as the original test signal for the given MS velocity and direction assumptions. Having 3 copies of the same fading signal does not change the Doppler frequencies associated with the 20 sub-components on each antenna (in the splitter case) because the mobile is not really moving and the Doppler shift is defined only based on the 20 virtual angles.

Cross polarized antennas are shown in these layout examples, and are modeled using a power that is specified by the cross polarization branch power ratio, which is specified by channel models such as the Spatial Channel Model. Thus the transmit antenna layout and average powers are specified via the spatial correlation for vertical polarized antennas as previously described. Then a certain power ratio is specified for the path from the channel model so that the total path power is divided between the vertically and horizontally polarized antennas with a given power ratio.

It should be noted that the correlation results between the target spatial correlation and the calculated spatial correlation scale with frequency as well as antenna separation.

It should also be noted that the match will work with other distributions like a continuous Laplacian (not 20 sum-of-sinusoids but a continuous distribution) or a Gaussian distribution, resulting in slightly different powers and angles.

As discussed above, it may be desirable to achieve a correlation match with two components, which indicates that the angle spread characteristics match also. For certain embodiments two components can provide an excellent match.

Figure 26:
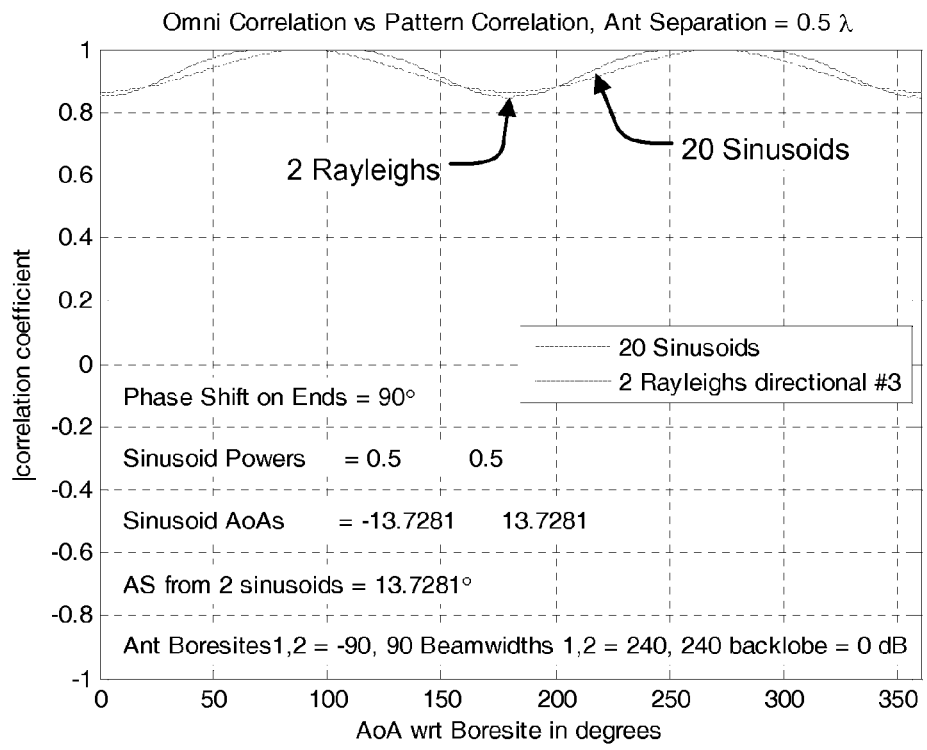
FIG. 26 illustrates the spatial correlation match using two components for a AS=3 degrees in Elevation.
Figure 27:
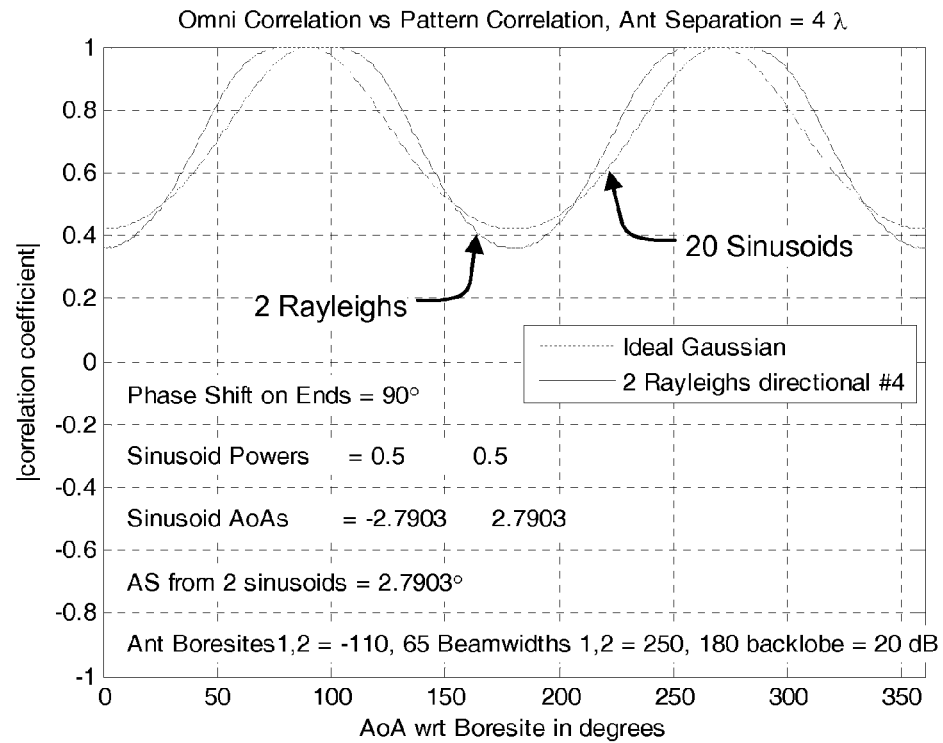
FIG. 27 illustrates the spatial correlation match using two components for a AS=10 degree Lapacian in Azimuth and AS=3 degrees Gaussian in Elevation.

FIG. 26 shows the match using two components for a AS=3 degree Gaussian in Elevation. For the phasing case using two components for a match to a AS=10 degree Laplacian in Azimuth and an AS=3 degrees Gaussian in Elevation, FIGS. 26 and 27 show the matching results.

There are many features and aspects of the present invention, some of which are briefly summarized below.

The concept of replacing individual unfaded or partially faded signal component sub-paths with a smaller number of faded signals to preserve:
1. the proper fading statistics (Rayleigh fade depth & autocorrelation)
2. the spatial correlation (based on angle spread)
3. the extension of the concept to include Elevation Spread
4. the extension of the concept to include 1 fading component that is replicated on one or more antenna probes with modified powers and phases.

Producing a Doppler characteristic of the composite signal by adjusting the constituent sinusoids on each of the transmit antennas to obtain the desired characteristic at the receive antennas, wherein the constituent sinusoids from each transmit antenna produce the fading signals that is transmitted on that transmit antenna. The adjustment includes modifying the Doppler frequency associated with a particular sub-path based on an angle to the direction of motion that is not the angle of the transmitting antenna to the direction of motion.

Producing a Doppler characteristic of the composite signal by adjusting the constituent sinusoids to form a fading signal which is further distributed to each of the transmit antennas, wherein the angle spread of the constituent sinusoids is adjusted to obtain the desired Doppler characteristic and combined with at least one power weighted and phased version of said fading signal, wherein the constituent sinusoids of the fading signals are distributed to the at least one other transmit antennas.

Regular: Forming a test signal wherein individual transmit antennas may transmit components of different paths at different delays, wherein components at a given delay transmitted from 2 or more antennas produce a certain path angle spread. This angle spread may be an azimuth spread, may be an elevation spread, or may be both an azimuth and elevation spread.

Phasing Case: Forming a test signal wherein 2 or more individual transmit antennas transmit components from a single fading source that are weighted and phased as appropriate to produce a certain path angle spread. This angle spread may be azimuth spread, may be an elevation spread, or may be both an azimuth and elevation spread OFDM case: Forming a test signal that is formed using one or more antenna probes, wherein signals having at one or more specific temporal delays are transmitted on selected antennas at selected powers in order to form a composite signal at a device under test.
1. Transmitting specific delayed replicas of the signals at generally decreasing powers as the delay increases, to form a frequency selective fading behavior of the composite signal.
2. Selecting powers and antenna probes (angles) in order to form an angle spread of the composite signal.
3. Forming a specific Angle of Arrival of the composite signal
4. Angle spread may be azimuth spread
5. Angle spread may be elevation spread
6. Angle spread may be both azimuth and elevation spread It should be noted that wider angle spreads are observed in WCDMA for lower to medium bandwidth cases. As the bandwidth increases, the ability to resolve smaller components in delay corresponding to signals with smaller azimuth and elevation spreads. Typical examples herein use 35 degree azimuth spreads for a 5 MHz radio, and different models that were 20 MHz had Azimuth spreads of 10-20 degrees, and elevation spreads of 3 deg per path.

As will be understood, some of the methods and techniques described herein may be implemented in software stored in memory and executed by a general purpose computer, or in other memory that can be distributed separately from the computer system, and an article of manufacture.

The techniques described herein can also include interfering signals and/or signals from multiple simulated base stations using a system which includes more than one channel emulator as described herein. The interfering signals may change in response to the simulated device under test movement. The mobile device may approach the interfering signal to the point where is becomes larger than the current desired signal, where the device under test will then be handed off from one desired serving signal to a different serving signal. An additional aspect is the changing signal conditions which may include signals from multiple simulated base stations, where a location estimate is also made.

The full air interface specification for one or more cellular telephony standards may be operated during the test and include handoff testing between different radio access technologies (RATS) or the measurement of one by the other.

The device under test may support additional features, such as GPS, Wireless LAN, Bluetooth, music players, video projectors, etc. These features may be controlled during the test to become active, and transmit and receive signals to support the given test.

The test of the mobile device can include setting up a call, transferring data, physical layer control functions such as power control, etc.

In embodiments, the systems described herein can operate in a multiple input multiple output N×M MIMO mode, where N is the number of antennas at the signal source and M is the number of receive antennas. In such a case, the propagation channel model between the signal source and the device under test can represent the signal paths between a plurality of antennas at the signal source and the receive antennas. The sub-paths of the signal paths are typically modeled with an angle distribution so that the path will have a particular power-angle spectrum. The effect of the angle distribution results in unique angle differences observed for each sub-path at each antenna in the set of receive antennas. When the sub-paths are combined on each antenna, the resulting signals will be correlated. The correlation is related to the path direction of arrival, the path's power-angle spectrum, and the antenna pattern of each antenna in the set. Received signals having high correlation are less able to support high throughput MIMO techniques and therefore it can be important to evaluate the device performance with specific channel characteristics.

Figure 28:
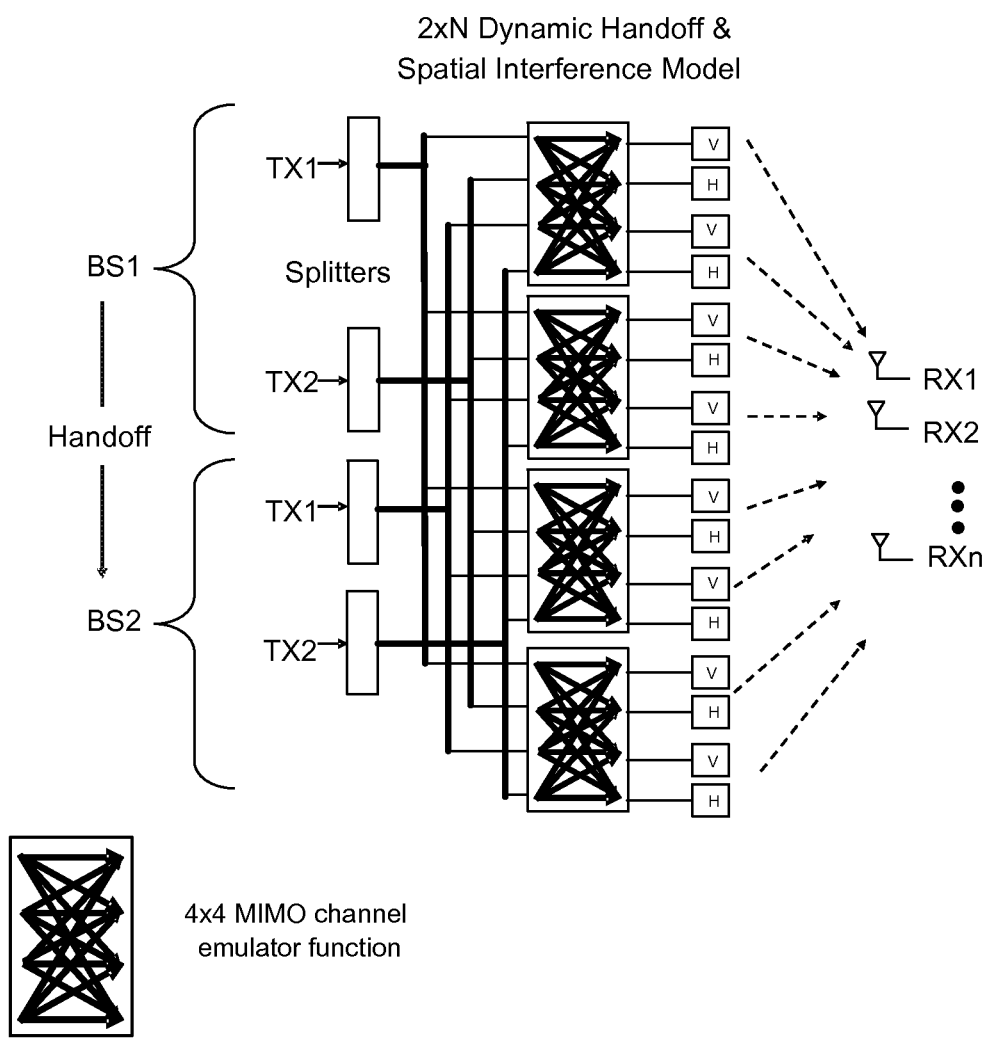
FIG. 28 is a simplified high level functional block diagram of a lab based system which can support MIMO handover testing and/or provide interfering signals.
Figure 29:
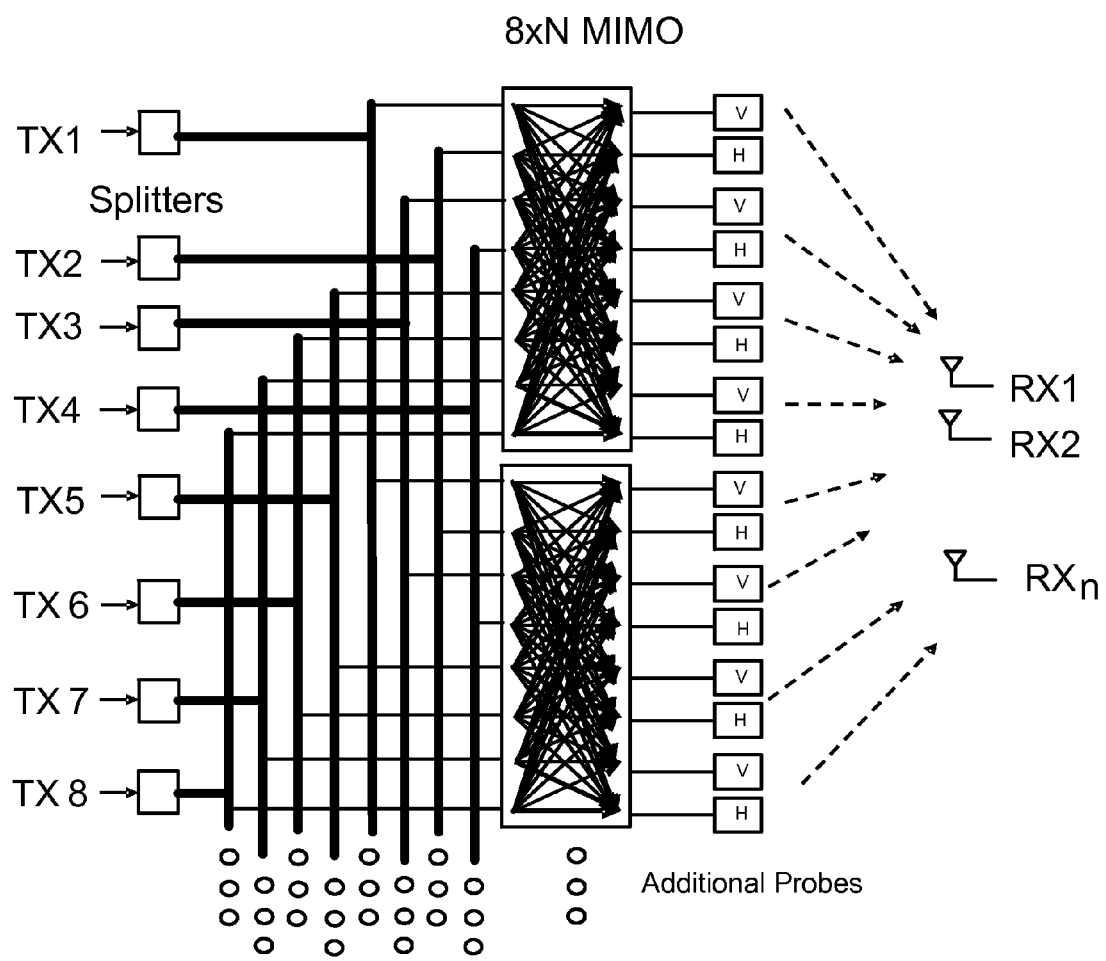
FIG. 29 is a simplified high level functional block diagram of a lab based system which can support 8×N MIMO.
Figure 30:
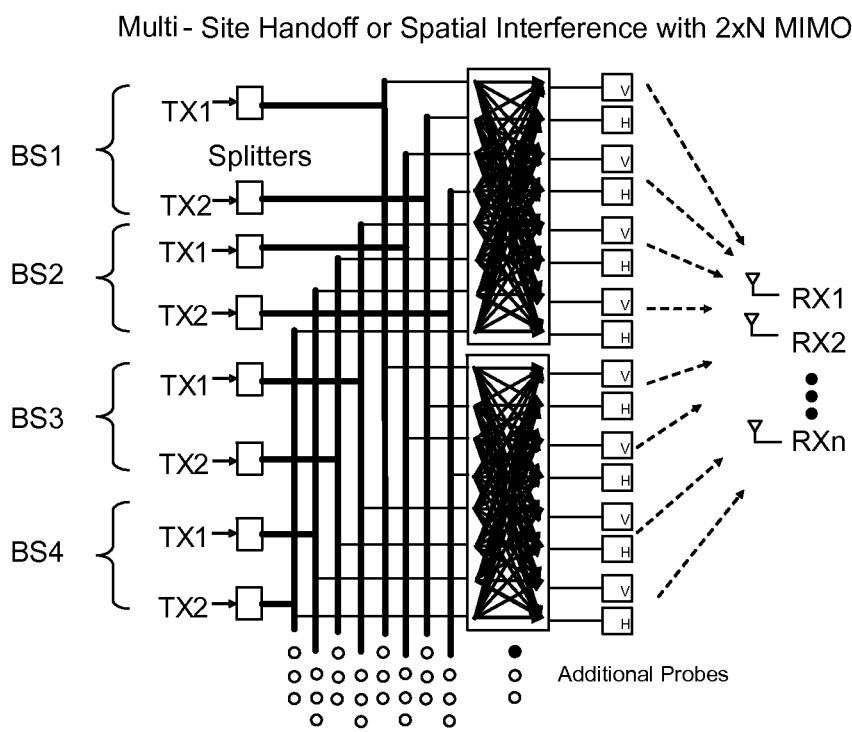
FIG. 30 is a simplified high level functional block diagram of a lab based system which can support multi-site handoff or Spatial Interference with 2×N MIMO.

FIG. 28 is a simplified high level functional block diagram of a lab based system 3300 having a reduced number of transmit antennas as described herein which can support MIMO handover testing and/or provide interfering signals. FIG. 29 is a simplified high level functional block diagram of a lab based system 3400 having a reduced number of transmit antennas as described herein to support 8×N MIMO. FIG. 30 is a simplified high level functional block diagram of a lab based system 3500 having a reduced number of transmit antennas as described herein which can support multi-site handoff or Spatial Interference with 2×N MIMO.

Figure 31:
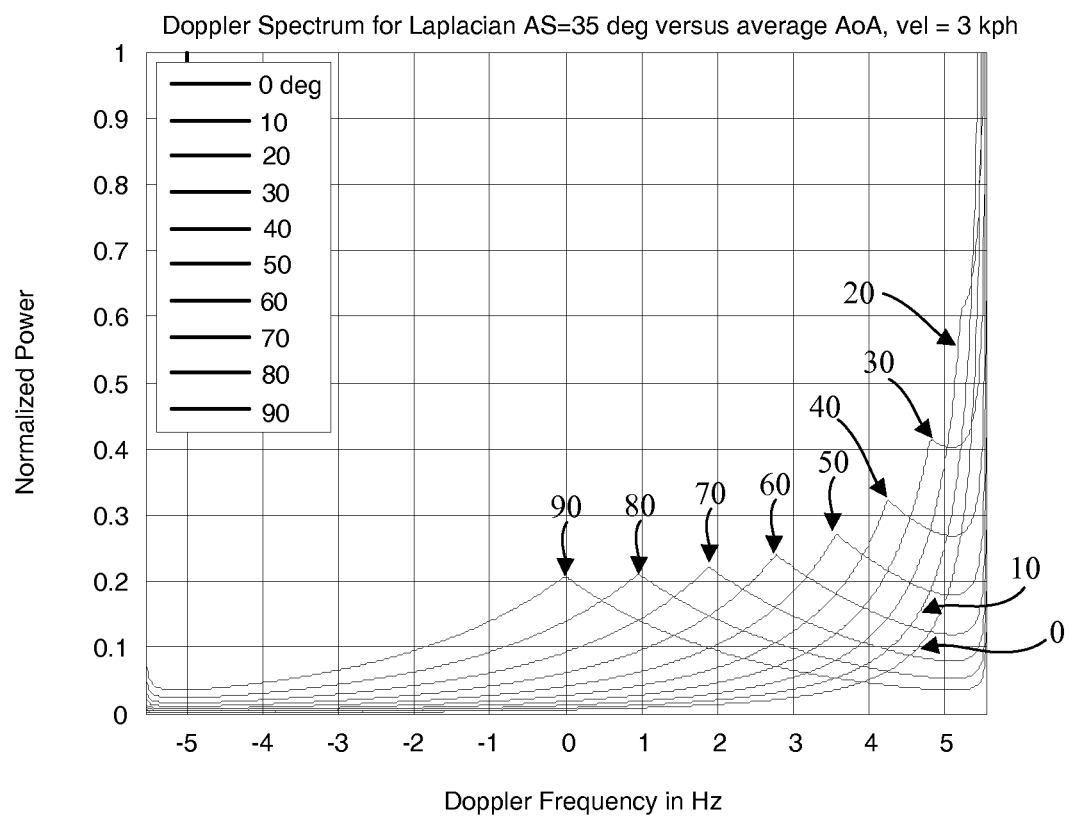
FIG. 31 is an example Doppler Spectra from Narrow Angle Spreads, for a Laplacian AS of 35 degrees and an assumed velocity of 3 kph.

Doppler mapping approaches can be applied to the techniques described herein to reuse existing Doppler filters to generate a mapping to the narrow angle spread signal's across N transmit antennas. FIG. 31 is an example Doppler Spectra from Narrow Angle Spread Signals, for a Laplacian AS of 35 degrees and an assumed velocity of 3 kph.

Doppler mapping is based on the power available from path/mid-paths transmitted on each probe. The Doppler can be adjusted to achieve the best overall match. The Doppler can be assumed to be non-resolvable, so the Doppler spectrum can be distributed among the probes as needed. A flat spectrum per path can be used in embodiments, and more than one path per transmit antenna at the same delay provides additional degrees of freedom to produce the desired Doppler mapping. Furthermore, the power available in each transmitted component can be distributed into a narrow or wide spectral shape to produce a variety of possible rectangles of the same area. This gives an additional degree of freedom to distribute the power such that the combination of all transmit antenna power contributions can be mapped into an approximate shape matching the target shape of the Doppler spectrum for the path AoA as shown in FIG. 31.

The mapping of the various sets of rectangles may be done using random search techniques, saving the results with minimum error. For a given selection of rectangles, whose powers are set by the power of each transmitted component, and whose width to height ratio is set randomly, the rectangles may be arranged by adjusting their frequency offset based on their height starting with the largest W/Hz rectangle until the minimum error is obtained wherein the frequency offset is fixed for that rectangle. This if followed by the rectangle with the second largest W/Hz and continues until the minimum error is obtained after arranging all rectangles, producing the closes possible match to the desired Doppler spectra. Additional trials are run with newly generated sets of rectangles and Doppler mapping with the lowest overall error is saved.

Figure 32:
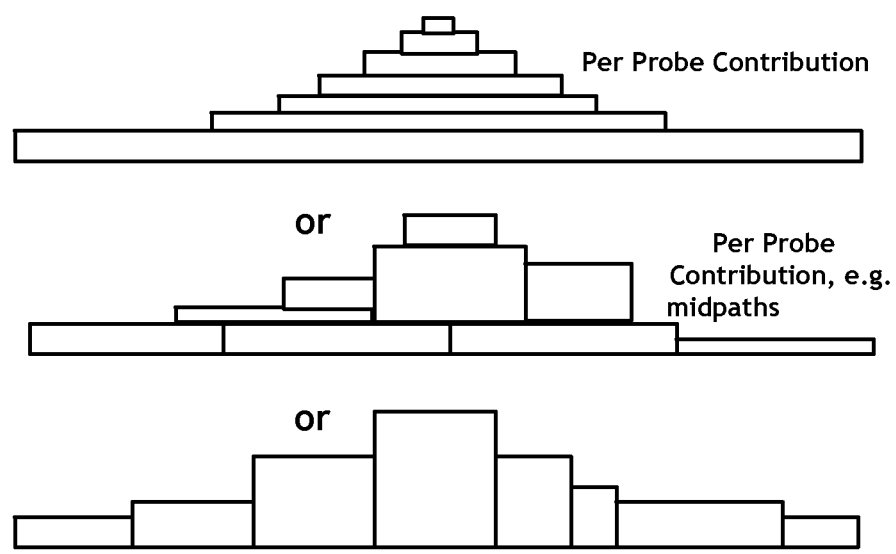
FIG. 32 illustrates three examples of the per probe contribution for an average AoA of 90 degrees.
Figure 33:
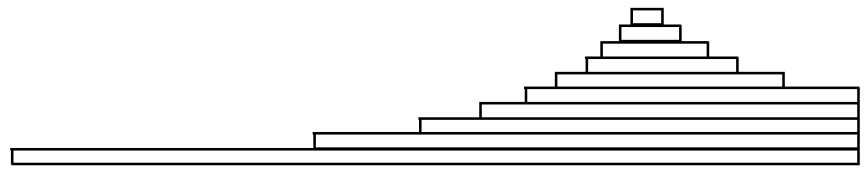
FIGS. 33 and 34 illustrate examples of the per probe contribution for an average AoA of 60 and 0 degrees respectively.
Figure 34:

FIG. 32 illustrates three examples of the per probe contribution for an average AoA of 90 degrees. FIGS. 33 and 34 illustrate examples of the per probe contribution for an average AoA of 60 and 0 degrees respectively.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system for emulating a wireless channel between a transmitter and a receiver, the wireless channel comprising one or more signal paths having respective amplitudes, angles of arrival and angle spreads, the system comprising:
   a set of two or more receive antennas, the set having an effective, non-singular spatial correlation for a given signal path in the wireless channel;
   a plurality of transmit antennas for transmitting transmit signals over the air to the set of receive antennas to emulate the given signal path in the wireless channel, the angle spread of the given signal path in the wireless channel represented as a plurality of N sub-paths, and the plurality of transmit antennas being less than N, and wherein the transmit antennas in the plurality are arranged at angular locations relative to the set of receive antennas in dependence upon said effective spatial correlation; and
   circuitry coupled to the plurality of transmit antennas to generate the transmit signals and provide the transmit signals to corresponding transmit antennas, wherein the transmit signals provided to the transmit antennas have a signal power in dependence upon said effective spatial correlation.

2. The system of claim 1, wherein the transmit antennas in the plurality are arranged in azimuth angles in dependence upon said effective spatial correlation.

3. The system of claim 2, wherein the transmit antennas in the plurality are further arranged in elevation angles in dependence upon said effective spatial correlation.

4. The system of claim 1, wherein the transmit signals provided to individual transmit antennas have a Doppler spectrum based on a virtual spatial movement parameter that represents spatial movement of the set of receive antennas relative to the plurality of transmit antennas, and wherein the Doppler spectrum of individual transmit signals are dependent upon the emulated path and the relative angular location of the corresponding transmit antennas.

5. The system of claim 1, wherein the transmit signals provided to individual transmit antennas have a Doppler spectrum based on a virtual spatial movement parameter that represents spatial movement of the set of receive antennas relative to the plurality of transmit antennas, and wherein the Doppler spectrum of a given transmit signal provided to a given antenna in the plurality of transmit antennas is dependent upon the emulated path.

6. The system of claim 4, wherein said circuitry:
generates a plurality of signal components of a transmit signal used to emulate the given signal path in the wireless channel; and
provides the signal components to a corresponding set of transmit antennas in the plurality of transmit antennas, wherein individual signal components have a Doppler spectrum dependent upon the emulated path and relative angular locations of each transmit antenna in the set of transmit antennas.

7. The system of claim 1, wherein the effective spatial correlation of the set of receive antennas is based on measured data of the antennas in the set.

8. The system of claim 1, including:
the angle spread of a second given signal path in the wireless channel represented as a plurality of M sub-paths;
the set of two or more receive antennas having a second effective, non-singular spatial correlation for the second given signal path in the wireless channel;
a second plurality of transmit antennas for transmitting second transmit signals to the set of receive antennas to emulate the second given signal path in the wireless channel, the second plurality of transmit antennas being less than M, and wherein the transmit antennas in the second plurality are arranged at angular locations relative to the set of receive antennas in dependence upon said second effective spatial correlation; and
said circuitry further coupled to the second plurality of transmit antennas to generate the second transmit signals and provide the second transmit signals to corresponding transmit antennas in the plurality of second transmit antennas.

9. The system of claim 8, wherein at least one transmit antenna is common to both the first and second plurality of transmit antennas.

10. The system of claim 8, wherein respective signal components for each of the first and second transmit signals are independently Rayleigh faded.

11. The system of claim 1, wherein the plurality of transmit antennas includes antennas arranged to transmit a first polarization, and antennas arranged to transmit a second polarization different from the first polarization.

12. The system of claim 11, wherein the second polarization is orthogonal to the first polarization.

13. The system of claim 11, wherein the plurality of transmit antennas includes a first antenna arranged to transmit the first polarization, and a second antenna arranged to transmit the second polarization, the first and second antennas co-located at the same angular location.

14. The system of claim 13, wherein a given transmit signal comprises a first signal component provided to the first antenna, and a second signal component provided to the second antenna.

15. The system of claim 1, wherein the correlation of signals measured at the receive antennas include signals having different polarizations.

16. The system of claim 1, wherein the transmit signals provided to the individual transmit antennas have a signal power dependent upon a polarization loss parameter that represents a difference in polarization between said individual transmit antennas and the set of receive antennas.

17. The system of claim 1, further for emulating a second wireless channel between a second transmitter and a second receiver, the second wireless channel comprising one or more signal paths having respective amplitudes, angles of arrival and angle spreads, the angle spread of a given signal path in the second wireless channel represented as a plurality of M sub-paths, and wherein:
the set of two or more receive antennas have a second effective, non-singular spatial correlation for the given signal path in the second wireless channel;
the transmit antennas in the plurality are at said angular location relative to the set of two or more receive antennas further in dependence upon said second effective spatial correlation; and
said circuitry further generates second transmit signals and provides the second transmit signals to corresponding transmit antennas to the given signal path in the second wireless channel, wherein the second transmit signals provided to the transmit antennas have a signal power dependent upon said second effective spatial correlation.

18. The system of claim 1, wherein:
the set of receive antennas have a measured spatial correlation for the relative angular location of the transmit antennas and the signal powers provided to the transmit antennas; and
a normalized least mean square error between the measured spatial correlation and said effective spatial correlation over a range of 0 to pi radians in azimuth is less than 0.05.

19. A method for emulating a wireless channel between a transmitter and a receiver, the wireless channel comprising one or more signal paths having respective amplitudes, angles of arrival and angle spreads, the method comprising:
determining an effective, non-singular spatial correlation of a given signal path for a set of two or more receive antennas;
computing angular locations for a plurality of transmit antennas relative to the set of two or more receive antennas in dependence upon said effective spatial correlation, the transmit antennas for transmitting transmit signals over the air to the set of receive antennas to emulate the given path in the wireless channel, the angle spread of the given signal path in the wireless channel represented as a plurality of N sub-paths, and the plurality of transmit antennas being less than N; and
generating the transmit signals and providing the transmit signals to corresponding transmit antennas, wherein the transmit signals have a signal power in dependence upon said effective spatial correlation.

20. The method of claim 19, wherein computing angular locations for the plurality of transmit antennas comprises computing azimuth angles in dependence upon said effective spatial correlation.

21. The method of claim 20, wherein computing angular locations for the plurality of transmit antennas further comprises computing elevation angles in dependence upon said effective spatial correlation.

22. The method of claim 19, wherein the transmit signals provided to individual transmit antennas have a Doppler spectrum based on a virtual spatial movement parameter that represents spatial movement of the set of receive antennas relative to the plurality of transmit antennas, and wherein the Doppler spectrum of individual transmit signals are dependent upon the emulated path and the relative angular location of the corresponding transmit antennas.

23. The method of claim 19, wherein the transmit signals provided to individual transmit antennas have a Doppler spectrum based on a virtual spatial movement parameter that represents spatial movement of the set of receive antennas relative to the plurality of transmit antennas, and wherein the Doppler spectrum of a given transmit signal provided to a given antenna in the plurality of transmit antennas is dependent upon the emulated path.

24. The method of claim 19, wherein:
said generating comprises generating a plurality of signal components of a transmit signal used to emulate the given signal path in the wireless channel; and
said providing comprises providing the signal components to a corresponding set of transmit antennas in the plurality of transmit antennas, wherein individual signal components have a Doppler spectrum dependent upon the emulated path and the relative angular locations of each transmit antenna in the set of transmit antennas.

25. The method of claim 19, wherein the effective spatial correlation of the set of receive antennas is based on measured data of the antennas in the set.

26. The method of claim 19, including the angle spread of a second given signal path in the wireless channel represented as a plurality of M sub-paths, the method further comprising:
determining a second effective, non-singular spatial correlation of the second given signal path for the set of two or more receive antennas;
computing angular locations for a second plurality of transmit antennas relative to the set of two or more receive antennas in dependence upon said second effective spatial correlation, the second plurality of transmit antennas for transmitting second transmit signals to the set of receive antennas to emulate the second given path in the wireless channel, the second plurality of transmit antennas being less than M; and
generating the second transmit signals and providing the second transmit signals to corresponding transmit antennas in the second plurality of transmit antennas, wherein the second transmit signals have a signal power in dependence upon said effective spatial correlation.

27. The method of claim 26, wherein at least one transmit antenna is common to both the first and second transmit antennas.

28. The method of claim 26, wherein respective signal components for each of the first and second transmit signals are independently Rayleigh faded.

29. The method of claim 19, wherein the plurality of transmit antennas includes transmit antennas arranged to transmit a first polarization, and antennas arranged to transmit a second polarization different from the first polarization.

30. The method of claim 29, wherein the second polarization is orthogonal to the first polarization.

* * * * *